(12) United States Patent
Saita et al.

(10) Patent No.: US 6,293,581 B1
(45) Date of Patent: Sep. 25, 2001

(54) OCCUPANT RESTRAINT DEVICE

(75) Inventors: Naohiko Saita; Takashi Aoki; Fumiharu Ochiai; Minoru Kanda, all of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/541,689

(22) Filed: Apr. 3, 2000

(30) Foreign Application Priority Data

| Apr. 15, 1999 | (JP) | 11-108239 |
| Apr. 15, 1999 | (JP) | 11-108240 |
| Apr. 15, 1999 | (JP) | 11-108241 |
| Apr. 15, 1999 | (JP) | 11-108242 |
| Apr. 15, 1999 | (JP) | 11-108243 |
| Apr. 15, 1999 | (JP) | 11-108244 |

(51) Int. Cl.$^7$ .................................................. B60R 21/22
(52) U.S. Cl. ..................................................... 280/730.2
(58) Field of Search ........................................ 280/730.2

(56) References Cited

U.S. PATENT DOCUMENTS

| 5,755,457 | * | 5/1998 | Specht | 280/730.2 |
| 5,788,270 | * | 8/1998 | HÅland et al. | 280/730.2 |
| 5,791,683 | * | 8/1998 | Shibata et al. | 280/730.2 |
| 5,899,486 | * | 5/1999 | Ibe | 280/730.2 |
| 5,899,491 | * | 5/1999 | Tschaeschke | 280/730.2 |
| 5,921,576 | * | 7/1999 | Sinnhuber | 280/730.2 |

FOREIGN PATENT DOCUMENTS

| 9-254734 | 9/1997 | (JP) . |
| 10-278723 | 10/1998 | (JP) . |

* cited by examiner

*Primary Examiner*—Kenneth R. Rice
(74) *Attorney, Agent, or Firm*—Armstrong, Westerman, Hattori, McLeland & Naughton, LLP

(57) ABSTRACT

An air bag of an inflatable curtain device includes a first cell group and a second cell group whose internal spaces are independent from each other. A high-pressure gas discharged from opposite ends of a common inflater disposed between both of the first and second cell groups and is supplied to a high-pressure gas supply port in the first cell group and a high-pressure gas supply port in the second cell group. The first and second cell groups can be expanded simultaneously by the common inflater, whereby the entire air bag can be deployed promptly, but also even when one of the first and second cell groups and is damaged, the deployment of the other cell group can be achieved without hindrance.

12 Claims, 26 Drawing Sheets

OUTER SIDE OF | INNER SIDE OF
VEHICLE BODY  | VEHICLE BODY

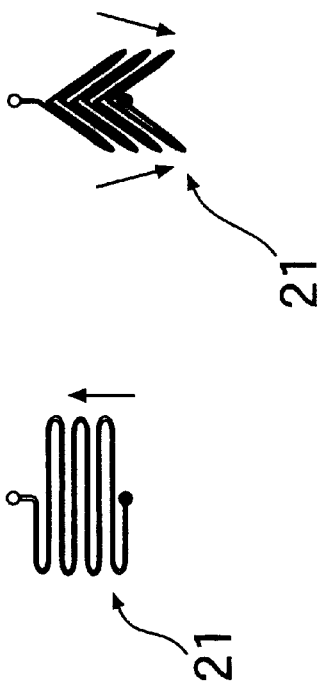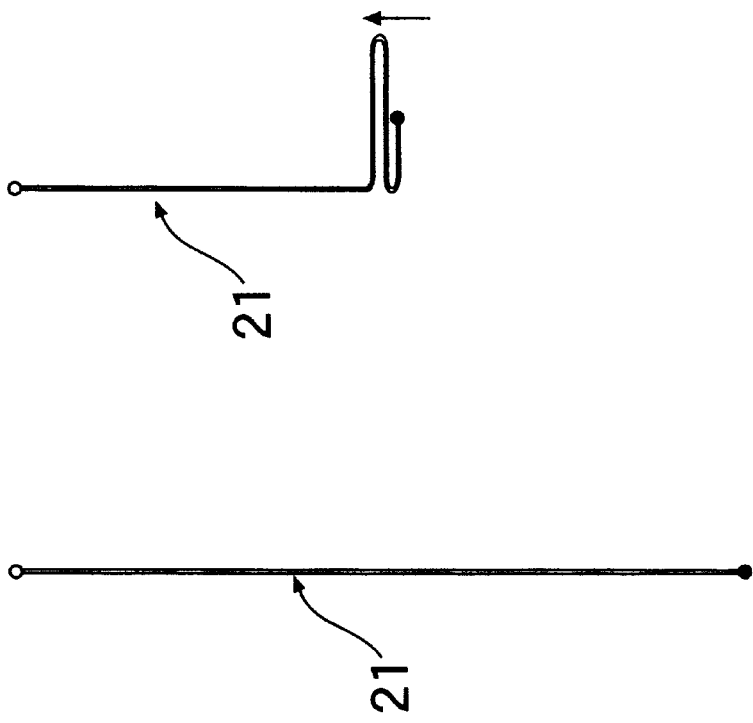

INNER SURFACE OF VEHICLE BODY

OCCUPANT RESTRAINT DEVICE

BACKGROUND OF THE INVENTION

1. Field of the Invention

The present invention relates to an occupant restraint device which includes a deployable air bag disposed in a folded-up state along an upper edge of a door opening in a vehicle body. The air bag is expanded by a high-pressure gas generated by an inflater in a curtain-shape along an inner surface of a side of a vehicle compartment upon collision with a vehicle.

2. Description of the Related Art

Such an occupant restraint device is known, for example, from Japanese Patent Application Laid-open No.10-278723.

The occupant restraint device described in the above Publication includes an inflater disposed at a lower portion of a front pillar and an attached air bag. A high-pressure gas generated by the inflater is supplied to a front end of the air bag, disposed along an upper edge of a door opening in a vehicle body, to deploy the air bag in a curtain-shape into a vehicle compartment.

In general, the air bag of the occupant restraint device is comprised of a congregation of a large number of expandable cells and folded into an longitudinally elongated shape to extend from a front pillar past a center pillar to a rear pillar of the vehicle. When the high-pressure gas is supplied from the inflater to one end of such longitudinally elongated air bag, a time lag exists between the expansion of the first end of the air bag and the expansion of the opposite rear end. For this reason, the expansion of the rear end is retarded, resulting in a possibility of underperformance of the occupant restraint device. If the volume of the gas propelled by the inflater is increased in order to solve such problem, it is a possibility that the internal pressure in the cell or cells approximate the inflater is increased excessively, and as a result, such cell can be damaged. In addition, when a portion of the air bag is damaged, the high-pressure gas can still be supplied to a cell group extending from the inflater to short of the damaged portion to expand the cells of such group. However there is a difficulty in supplying high-pressure gas to a cell group located beyond of the damaged portion, thus incompletely expanding the cells of such cell group, resulting in reduced performance.

The occupant restraint device described in the above Patent is designed to commonly fasten the folded air bag and an air bag holder to the vehicle body by a common bolt. The air bag is disposed within an air bag case made of a synthetic resin. The bolt is passed through a mounting portion, extending in a flange-shape, of the air bag case, the base end of the air bag and the air bag holder to fasten them to the vehicle body.

In the known occupant restraint device, in order to reliably support the folded air bag on the air bag holder, it is necessary to accommodate the air bag within an air bag cover formed of a synthetic resin and having a high rigidity. When a simple air bag cover such as a fabric is used, it is difficult to correctly position the air bag in the air bag holder. An air bag cover having a high rigidity is requisite. However this is disadvantageous with respect to the weight and the cost.

The front end of the air bag of the occupant restraint device described in the above Patent is disposed in a folded state in a space sandwiched between the front pillar and the front pillar garnish. The air bag, when expanded upon collision of the vehicle, enters a passage defined between the front pillar and a large number of rib-shaped energy absorbing members provided on an inner surface of the front pillar garnish. The expanding air bag forces the front pillar garnish open and the air bag fully deploys through the resulting opening into the vehicle compartment.

In the above known occupant restraint device, however, a pointed or sharp corner or edge exists on the surface of each of the energy absorbing members facing the passage. For this reason, when the air bag is expanded to force the front pillar garnish open, there is a possibility that the air bag will be caught on the sharp corners of the energy absorbing members, whereby the smooth and even deployment of the air bag will be impeded damaging the air bag.

In addition, the occupant restraint device described in the above Patent includes the inflater disposed at the lower portion of the front pillar, so that the high-pressure gas generated by the inflater is supplied to the front end of the air bag disposed along the upper edge of the door opening in the vehicle body, to deploy the air bag in the curtain-shape into the vehicle compartment.

The above description for Japanese Patent Application Laid-Open No. 10-278723 applies generally to the known prior art.

In order to solve such problem, it is conceived that a plurality of cell groups, with their internal spaces independent from one another, are defined in the air bag, and the high-pressure gas is supplied to a high-pressure gas supply port provided in each of the cell groups. However, if additional inflaters are mounted in correspondence to the separate cell groups, the number of the inflaters is increased, increasing the cost and the weight of the device.

The air bag of the inflatable curtain device described in the above Patent Application Laid-open No. 10-278723 includes the plurality of cells disposed in the longitudinal direction of the vehicle body, wherein the diameter of the cells in front and rear of the center pillar is larger than those of the other cells. Therefore, when a head of an occupant sitting on a front seat urges against the air bag toward the vehicle body, the larger-diameter cells are caught on a rear surface of the center pillar, whereby the forward movement of such cells is hindered. Thus, the tension of that portion of the air bag located ahead of the center pillar is maintained, leading to an enhanced performance of holding back the occupant sitting on the front seat.

The occupant restraint performance required for an air bag of an inflatable curtain is the highest at a location approximate to a pillar having a high rigidity and relatively low at a location approximate to a door glass. For this reason, it is necessary to promptly expand those cells of the air bag which are located in the vicinity of the pillar. In the above known occupant restraint device, however, the diameter (and volume) of the cells located immediately in the rear of the pillar is larger, and for this reason, there is a possibility that the expansion of the larger-diameter cells takes more time than expansion of the other cells, resulting in a reduced occupant restraint performance.

Such occupant holding-back device is known, for example, from Japanese Patent Application Laid-open No.9-254734.

The occupant restraint device described in the above Patent is designed, so that an air bag is disposed in a vertically zigzag folded state within a cover and is expanded by a high-pressure gas supplied from an inflater to force a cut portion of a lower surface of the cover open to become deployed downwards into a vehicle compartment upon collision with another vehicle.

FIGS. 26A to 26D show the course of deployment of the air bag of the above known occupant restraint device, wherein an upper base end of the air bag shown in section indicated by an open circle, and a lower tip end of the air bag is indicated by a black dot.

The nonexpanded air bag is folded in the vertically zigzag manner (see FIG. 26A). When the high-pressure gas is supplied from the inflater to the base end of the air bag, due to collision of the vehicle, the expansion of the air bag is started at its base end (see FIG. 26B). In the course of spreading of the expanded area of the air bag from the base end toward the tip end thereof, the tip end may be caught on the inner surface of the side of the vehicle compartment (on an inner surface of the pillar or a door) in some cases (see FIG. 26C). When the high-pressure gas is further supplied in this state to start the expansion of the air bag at its tip end, the rigidity of the air bag is increased by an increase in internal pressure, because the air bag is intended to extend straight. As a result, the tip end of the air bag may be strongly urged against the inner surface of the side of the vehicle compartment and the air bag maybe bent into a at an intermediate portion thereof and fail to be deployed smoothly and evenly downwards (see FIG. 26D).

SUMMARY OF THE INVENTION

Accordingly, it is a first object of the present invention to ensure that the air bag of the occupant restraint device is deployed promptly and reliably.

It is a second object of the present invention to ensure that the air bag can be supported reliably on the air bag holder with a reduced number of parts using a simple air bag cover made of a material such as a fabric, or without use of an air bag cover.

It is a third object of the present invention to ensure that the air bag of the occupant restraint device can be deployed smoothly from a space sandwiched between the front pillar and the front pillar garnish.

It is a fourth object of the present invention to ensure that the high-pressure gas can be supplied reliably from a single inflater to a plurality of high-pressure gas supply ports defined in the air bag of the occupant restraint device.

It is a fifth object of the present invention to ensure that the expansion speed of the air bag of the inflatable curtain device can be controlled to any level depending on the magnitude of the occupant restraint or holding back performance required for various portions of the air bag.

It is a sixth object of the present invention to prevent the tip end of the air bag of the occupant restraint device from being caught on the inner surface of the side of the vehicle compartment, thereby failing to deploy smoothly in the course of deployment of the air bag.

To achieve the above object, according to a first aspect and feature of the present invention, there is provided an occupant restraint device comprising an air bag disposed in a folded-up state along an upper edge of a door opening in a vehicle body, so that the air bag is expanded by a high-pressure gas generated by an inflater upon collision of a vehicle and deployed in a curtain-shape along an inner surface of a side of a vehicle compartment, wherein the air bag comprises a first cell group and a second cell group which are disposed separately in a longitudinal direction of the vehicle body with their internal spaces independent from each other, the first and second cell groups being provided with a first high-pressure gas supply port and a second high-pressure gas supply port, respectively, to which the high-pressure gas is supplied from the common inflater.

With the above arrangement, the internal space in the air bag is divided into the first and second cell groups, and the high-pressure from the common inflater is supplied to the first and second high-pressure gas supply ports provided in the first and second cell groups, respectively. Therefore, the first and second cell groups can be expanded simultaneously by the inflater, whereby the entire air bag can be deployed promptly, but also even when one of the first and second cell groups is damaged, the deployment of the other cell group can be achieved without hindrance.

To achieve the first object, according to a second aspect and feature of the present invention, there is provided an occupant restraint device comprising an air bag disposed in a folded-up state along an upper edge of a door opening in a vehicle body, so that the air bag is expanded by a high-pressure gas generated by an inflater upon collision of a vehicle and deployed in a curtain-shape along an inner surface of a side of a vehicle compartment, wherein the air bag comprises a single group of cells with their internal spaces communicating with one another, the cell group being provided at its front end with a first high-pressure gas supply port to which the high-pressure gas is supplied from a first inflater, and at its rear end with a second high-pressure gas supply port to which the high-pressure gas is supplied from a second inflater.

With the above arrangement, the high-pressure gas is supplied from the first inflater to the first high-pressure gas supply port at the front end of the single cell group with the internal cell spaces communicating with one another, and the high-pressure is supplied from the second inflater to the second high-pressure gas supply port at the rear end of the cell group. Therefore, the entire air bag can be deployed promptly and uniformly, but also even when a portion of the cell group is damaged, the high-pressure gas can be supplied from the first or second inflater to the cells located in front and rear of the damaged portion to achieve the deployment of the air bag without hindrance.

To achieve the second object, according to a third aspect and feature of the present invention, there is provided an occupant restraint device comprising an air bag which is supported in a folded-up state on an air bag holder fixed along an upper edge of a door opening in a vehicle body, so that the air bag is expanded by a high-pressure gas generated by an inflater upon collision of a vehicle and deployed in a curtain-shape along an inner surface of a side of a vehicle compartment, wherein the air bag holder comprises a body portion and support arms integrally formed of a synthetic resin and openably and closeably connected to the body portion, the support arms, the air bag and the body portion being commonly fastened to the upper edge of the door opening in the vehicle body by common bolts in a state in which the folded-up air bag has been supported on the support arms along the body portion.

With the above arrangement, to support the air bag in the folded-up state on the air bag holder fixed along the upper edge of the door opening in the vehicle body, the air bag is supported on the support arms along the body portion of the air bag holder, and the support arms, the air bag and the body portion are commonly fastened to the vehicle body by the common bolts. Thus, the air bag holder and the air bag can be supported reliably on the vehicle body by a minimum number of the bolts without need for an air bag cover having a high rigidity, but also the air bag can be positioned correctly on the body portion of the air bag holder. Moreover, since the body portion and the support arms of the air bag holder are integrally formed into a unitary structure composed of synthetic resin, the number of parts and the number of assembling steps can be reduced, as compared with a case where support arms separate from the body portion are used.

To achieve the third object, according to a fourth aspect and feature of the present invention, there is provided an occupant restraint device comprising an air bag disposed in a folded-up state along an upper edge of a door opening in a vehicle body, so that the air bag is expanded by a high-pressure gas generated by an inflater upon collision of a vehicle and deployed in a curtain-shape along an inner surface of a side of a vehicle compartment, wherein a front end of the air bag is accommodated in a space sandwiched between a front pillar and a front pillar garnish, the front pillar garnish having energy absorbing members disposed on its inner surface, so that they are located in the rear of the air bag, a passage being defined between the front pillar and the energy absorbing members for assisting in the deployment of the air bag, the surface of each of the energy absorbing members facing the passage, i.e., clearance, being formed into a smooth curved surface having no sharpness.

With the above arrangement, the front end of the air bag expanded upon collision of the vehicle enters the passage defined between the energy absorbing members provided on the inner surface of the front pillar garnish and the front pillar, whereby the air bag forces the front pillar garnish open by a produced pressure to become deployed through the resulting opening into the vehicle compartment. Since the surface of each of the energy absorbing members facing the passage is formed into a smooth curved surface having no sharpness, the air bag forcing the front pillar garnish open to become deployed is prevented from being caught on the energy absorbing members or from being damaged, and hence, the air bag can be deployed smoothly.

To achieve the fourth object, according to a fifth aspect and feature of the present invention, there is provided an occupant restraint device comprising an air bag disposed in a folded-up state along an upper edge of a door opening in a vehicle body, so that the air bag is expanded by a high-pressure gas generated by an inflater upon collision of a vehicle and deployed in a curtain-shape along an inner surface of a side of a vehicle compartment, wherein the occupant restraint device includes an inflater accommodated in an inflater case having a plurality of high-pressure gas ejecting ports which are connected to a plurality of high-pressure gas ejecting ports provided in the air bag, respectively.

With the above arrangement, the plurality of high-pressure gas ejecting ports are provided in the inflater case having the inflater accommodated therein, and are connected to the plurality of high-pressure gas ejecting ports provided in the air bag, respectively. Therefore, the high-pressure gas discharged from the single inflater can be diverted by a simple structure and supplied reliably into the plurality of high-pressure gas supply ports in the air bag.

To achieve the fifth object, according to a sixth aspect and feature of the present invention, there is provided an occupant restraint device comprising an air bag disposed in a folded-up state along an upper edge of a door opening in a vehicle body, so that the air bag is expanded by a high-pressure gas generated by an inflater upon collision of a vehicle and deployed in a curtain-shape along an inner surface of a side of a vehicle compartment, wherein the air bag is comprised of a plurality of cells expandable by a high-pressure gas, a high-pressure gas supply passage provided along base ends of the cells to guide the high-pressure gas from an inflater, and through-bores for supplying the high-pressure gas from the high-pressure gas supply passage to the cells, the opening areas of the through-bores being varied depending on the positions of the cells.

With the above arrangement, the air bag is comprised of the plurality of expandable cells, the high-pressure gas supply passage for guiding the high-pressure gas from the inflater, and the through-bores for supplying the high-pressure gas from the high-pressure gas supply passage to the cells, and the opening areas of the through-bores are varied depending on the positions of the cells. Therefore, the timings of expansion of the cells, to which the high-pressure gas is supplied from the inflater via the high-pressure gas supply passage and the through-bores, can be controlled to any level depending on the opening areas of the through-bores, thereby enhancing the occupant holding-back performance of the air bag.

To achieve the sixth object, according to a seventh aspect and feature of the present invention, there is provided an occupant restraint device comprising an air bag disposed in a folded-up state along an upper edge of a door opening in a vehicle body, so that the air bag is expanded by a high-pressure gas generated by an inflater upon collision of a vehicle and deployed in a curtain-shape along an inner surface of a side of a vehicle compartment, wherein the air bag is folded double with its tip end superposed on its surface on the side of the vehicle compartment and is then folded up in a vertically zigzag manner.

With the above arrangement, the air bag is first folded double with its tip end superposed on its surface on the side of the vehicle compartment and is then folded up in a vertically zigzag manner. Therefore, when the air bag is deployed, the zigzag folding-up of the air bag is released, and further, the double-folding of the air bag is released. In this course, the tip end of the air bag is passed through a position spaced apart from the inner surface of the side of the vehicle compartment (namely, a position closer to a central portion of the vehicle compartment). Thus, it is possible to prevent the tip end from being caught on the inner surface of the side of the vehicle compartment, thereby enabling the smooth and reliable deployment of the air bag.

To achieve the above sixth object, according to an eighth aspect and feature of the present invention, there is provided an occupant restraint device comprising an air bag disposed in a folded-up state along an upper edge of a door opening in a vehicle body, so that the air bag is expanded by a high-pressure gas generated by an inflater upon collision of a vehicle and deployed in a curtain-shape along an inner surface of a side of a vehicle compartment, wherein the air bag is folded up in a vertically zigzag manner and then folded double in a widthwise direction, so that its tip end is covered with the air bag itself.

With the above arrangement, the air bag is first folded up in a vertically zigzag manner and then folded double in the widthwise direction, so that its tip end is covered with the air bag itself. Therefore, in the course of deployment of the air bag, the tip end of the air bag cannot be exposed before releasing of the folded the air bag. Thus, it is possible to prevent the tip end from being caught on the inner surface of the side of the vehicle compartment, thereby enabling the smooth and reliable deployment of the air bag.

The above and other objects, features and advantages of the invention will become apparent from the following description of the preferred embodiments taken in conjunction with the accompanying drawings.

BRIEF DESCRIPTION OF THE DRAWINGS

FIGS. 1 to 13 show a first embodiment of the present invention, wherein

FIG. 1 is a perspective view of the inside of a vehicle compartment in an automobile;

FIG. 2 is a view similar to FIG. 1, but showing a state in which an air bag of an occupant restraint device has been deployed;

FIG. 3 is an enlarged view of an area indicated by 3 in FIG. 2;

FIG. 4 is an enlarged sectional view taken along a line 4—4 in FIG. 1;

FIG. 5 is an enlarged sectional view taken along a line 5—5 in FIG. 1;

FIG. 6 is an enlarged sectional view taken along a line 6—6 in FIG. 1;

FIG. 7 is an enlarged sectional view of an area indicated by 7 in FIG. 3;

FIG. 8 is an enlarged sectional view taken along a line 8—8 in FIG. 3;

FIG. 9 is an exploded perspective view of the occupant restraint device;

FIG. 12 is a view similar to FIG. 5, but for explaining the operation during deployment of the air bag;

FIG. 13 is a view similar to FIG. 6, but for explaining the operation during deployment of the air bag;

FIG. 17 being a view similar to FIG. 7,

FIG. 18 being a view taken along a line 18—18 in FIG. 17;

FIG. 19 being an enlarged view of an essential portion of an air bag,

FIG. 20 being an enlarged view of an area indicated by 20 in FIG.19;

FIGS. 22 to 23C show an eighth embodiment of the present invention;

FIG. 22 being a view similar to FIG.3;

FIGS. 23A to 23C are diagrams showing steps of producing an air bag by sewing;

FIGS. 24A to 25D show a ninth embodiment of the present invention;

FIGS. 24A to 24D being diagrams for explaining the operation during folding of an air bag;

FIGS. 25A to 25D being diagrams for explaining the operation during deployment of the air bag.

DESCRIPTION OF THE PREFERRED EMBODIMENTS

The present invention will now be described by way of embodiments with reference to the accompanying drawings.

First, a first embodiment of the present invention will be described with reference to FIGS. 1 to 13.

Figure 1:
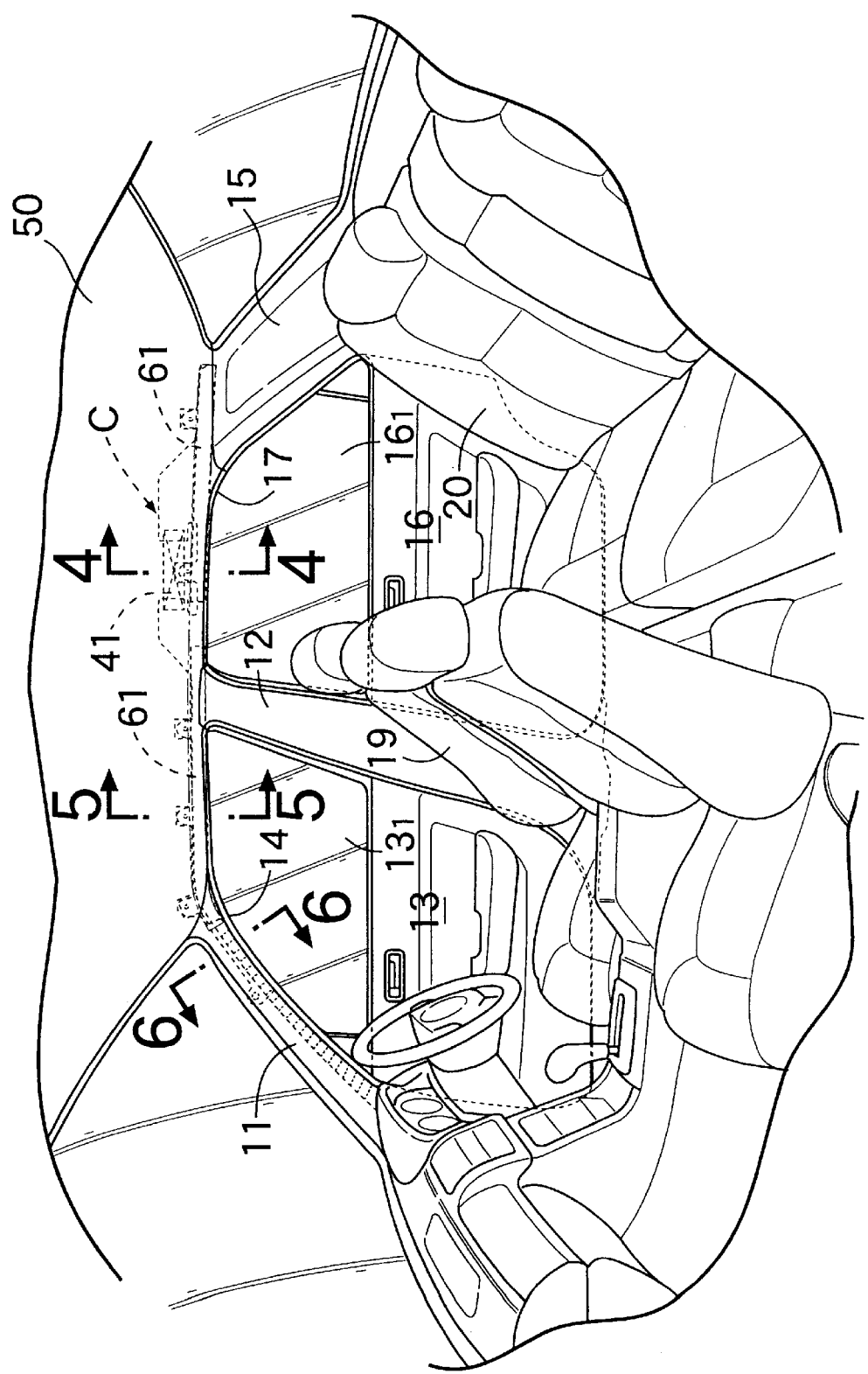

As shown in FIG. 1, a door opening 14 for mounting of a front door 13 between a front pillar 11 and a center pillar 12 is defined in a side of a vehicle body of a vehicle, and a door opening 17 for mounting a rear door 16 between the center pillar 12 and a rear pillar 15 is also defined in the side of the vehicle body. A roof side rail 18 (see FIG. 4) extends in a longitudinal direction of the vehicle body to connect an upper end of the front pillar 11 and an upper end of the rear pillar 15. The roof side rail 18 partitions upper edges of the door openings 14 and 17 for the front door 13 and the rear door 16 from each other. An occupant restraint device C is mounted along the roof side rail 18. The occupant restraint devices C having the substantially same structures are mounted on left and right opposite sides of the vehicle body, respectively. The occupant restraint device which is mounted on the right side of the vehicle body, representative of both restraint devices, will be described below.

Figure 2:
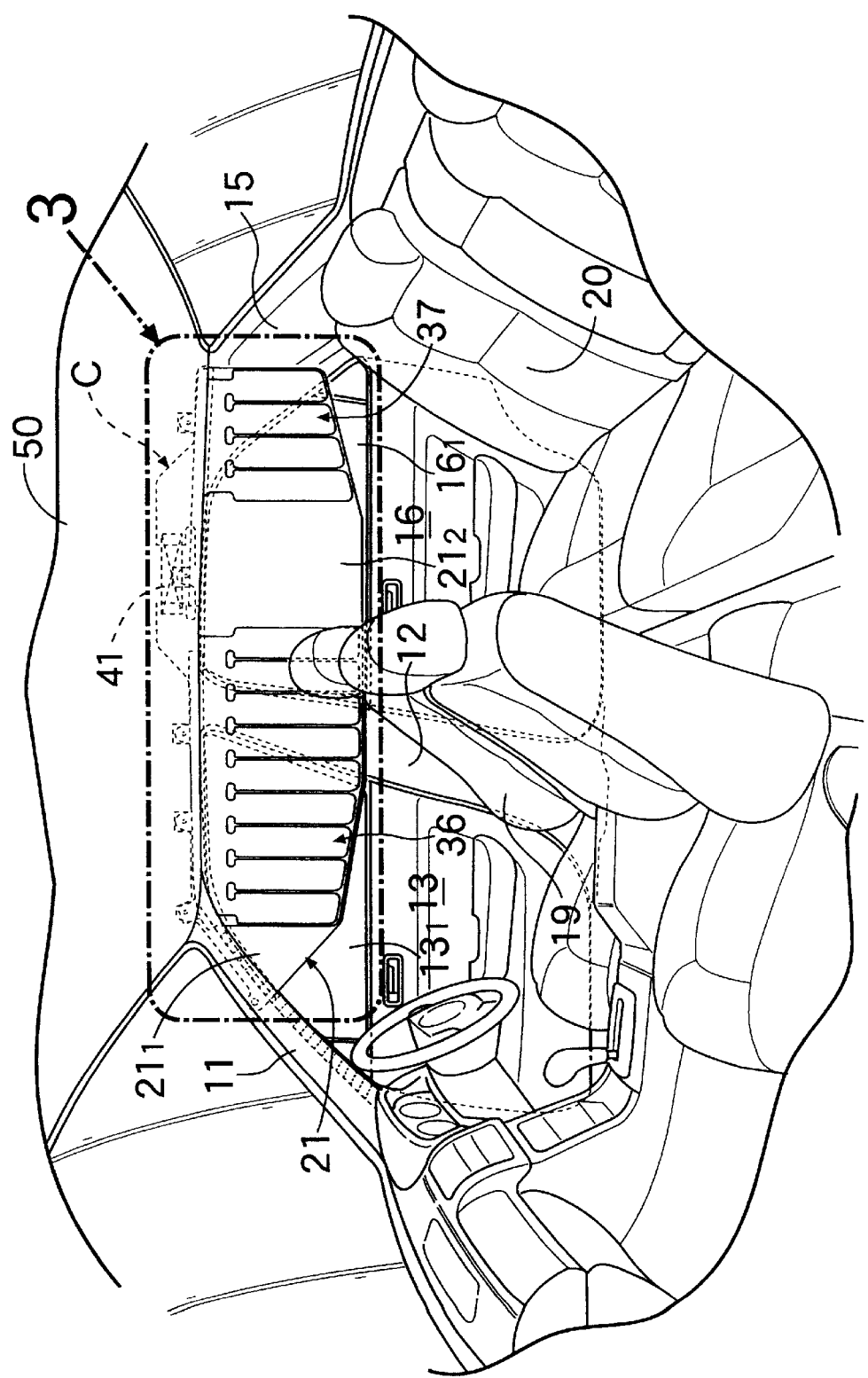

As shown in FIG. 2, when an acceleration of a predetermined value or more is detected upon a side collision of the vehicle or during rolling-over of the vehicle, an air bag 21 of the occupant restraint device C is deployed downwards into a curtain-shape from the upper edges of the door openings 14 and 17 to break in between occupants sitting on a front seat 19 and a rear seat 20 and an internal side face of the vehicle body, i.e., the front pillar 11, the center pillar 12, the rear pillar 15, a door glass $13_1$ of the front door 13 and a door glass 16, of the rear door 16.

Figure 3:
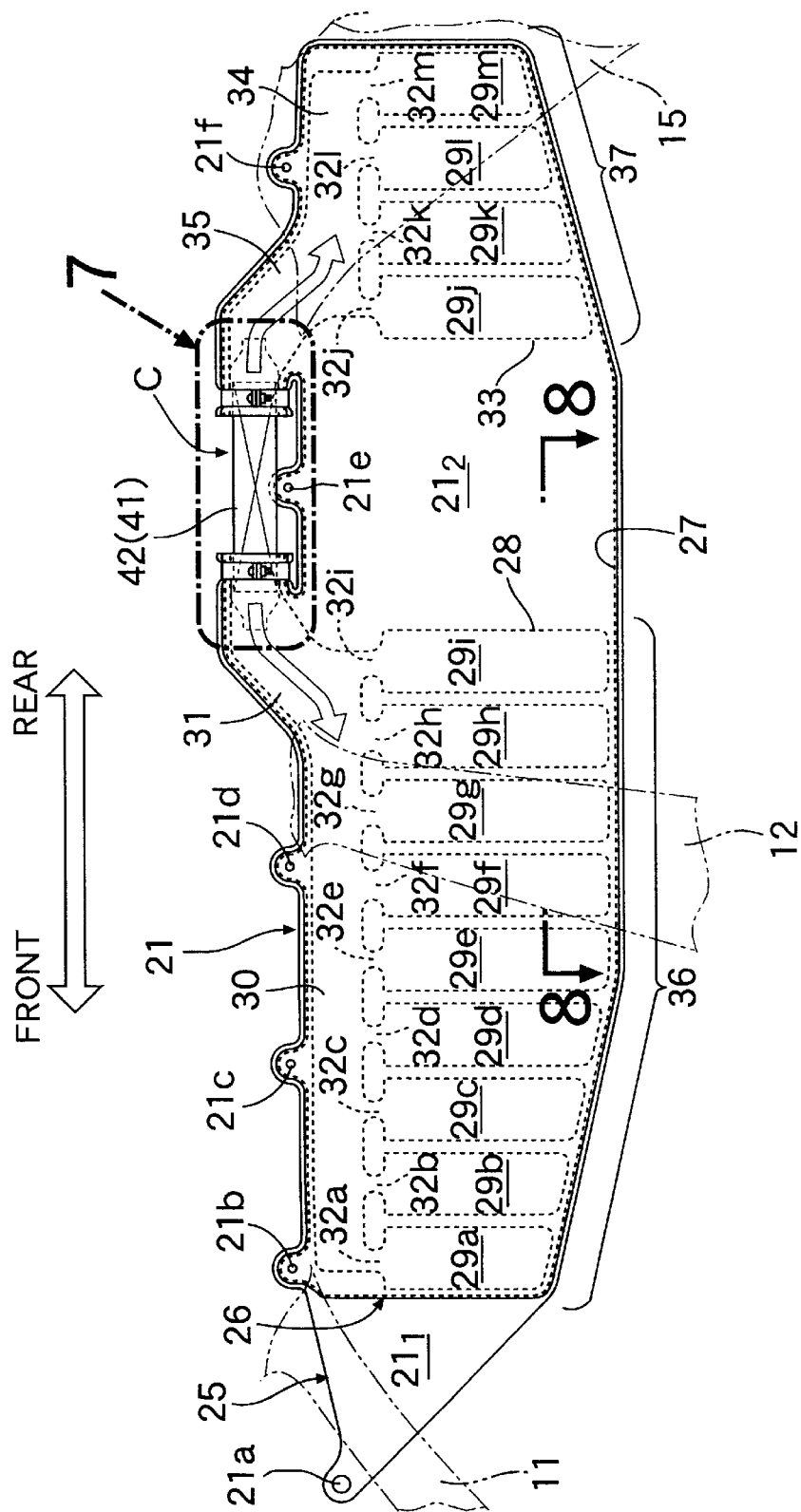

As shown in FIG. 3, the air bag 21 extending in the longitudinal direction of the vehicle body is made by doubly superposing first and second ground fabrics 25 and 26 having substantially the same shapes to sew them along line 27. The first ground fabric 25, slightly larger than the second ground fabric 26, has a front end which slightly protrudes as an non-expandable portion $21_1$ from a front edge of the second ground fabric 26. The shapes of the first and second ground fabrics 25 and 26 can be selected as desired, and may be identical to each other.

Nine cells 29a, 29b, 29c, 29d, 29e, 29f, 29g, 29h and 29i, a single first high-pressure as supply passage 30 and a single first high-pressure gas supply port 31 are provided in a front portion of the air bag 21 by sewing along line 28. The first high-pressure gas supply port 31 opens rearwards of the vehicle body at a base end (an upper end) of the air bag 21, and the first high-pressure gas supply passage 30 extends from such opening in a forward direction of the vehicle body along the base end of the air bag 21. The first high-pressure gas supply passage 30 communicates with upper ends of the nine cells 29a to 29i through nine communication bores 32a, 32b, 32c, 32d, 32e, 32f, 32g, 32h and 32i, respectively, and lower ends of the cells 29a to 28i extending downwards from the through-bores 32a to 32i are closed.

Four cells 29j, 29k, 29l and 29m, a single second high-pressure gas supply passage 34 and a single second high-pressure gas supply port 35 are provided in a rear portion of the air bag 21 by sewing along line 33. The second high-pressure gas supply port 35 opens forwards of the vehicle body at the base end (upper end) of the air bag 21, and the second high-pressure gas supply passage 34 extends rearwards of the vehicle body from such opening along the base end of the air bag 21. The second high-pressure gas supply passage 34 communicates with upper ends of the four cells 29j to 29m through four through-bores 32j, 32k, 32l and 32m, respectively, and lower ends of the cells 29a to 28i extending downwards from the through-bores 32j to 32m are closed.

The front nine cells 29a to 29i constitute a first group of cells 36 communicating with one another, and the rear four cells 29j to 29m constitute a second group of cells 37 communicating with one another. As can be seen from FIG.8, the cells 29a to 29m are expanded into circular cross-sectional shape under the supplying of a high-pressure gas, thereby exhibiting a buffering effect to protect the occupant from the secondary collision. The first high-pressure gas supply port 31 for supplying the high-pressure gas to the first cell group 36 and the second high-pressure gas supply port 35 for supplying the high-pressure gas to the second cell group 37 are opposed to each other at a distance spaced apart from each other above that non-expandable portion $21_2$ of the air bag 21 in which no cells are formed.

In this way, the first and second high-pressure gas supplying passages 30 and 34 and the through-bores 32a to 32m for supplying the high-pressure gas to the cells 29a to 29m of the air bag 21 are defined by sewing of the first and second ground fabrics 25 and 26 for the air bag 21. Therefore, special members for defining the first and second high-pressure gas supplying passages 30 and 34 and the through-bores 32a to 32m are not required, which can contribute to reductions in number of parts and in weight of the occupant restraint device. In place of coupling the first and second ground fabrics 25 and 26 to each other by sewing along lines 27, 28 and 33, the first and second ground fabrics 25 and 26 may be coupled to each other by bonding or welding.

Six mounting bores 21a, 21b, 21c, 21d, 21e and 21f are defined along the base end of the air bag 21. The foremost mounting bore 21a is defined in the non-expandable portion $21_1$ extending in front of the first cell group 36. The subsequent three mounting bores 21b, 21c and 21d are defined above the first cell group 36, and the next one mounting bore 21e is defined above the non-expandable portion $21_2$. The rearmost mounting bore 21f is defined above the second cell group 37.

Upon the side collision of the vehicle, the expanded cells 29a to 29i in the front first cell group 36 are deployed in an area from the upper portion of the front pillar 11 to the rear portion of the center pillar 12 to hold back the occupant sitting on the front seat 19. The expanded cells 29j to 29m in the rear second cell group 37 are deployed in an area from a central portion of the rear door 16 to a central portion of the rear pillar 15 to hold back the occupant sitting on the rear seat 20. At this time, the non-expandable portion $21_2$ of the air bag 21 is located at that front portion of the rear door 16 in which there is less possibility of an interference provided by the occupant sitting on the rear seat 20.

Among the through-bores 32a to 32j in the nine cells 29a to 29i in the first cell group 36, the through bores 32f to 32i in the four cells 29f to 29i located in the vicinity of the center pillar 12 have passage sectional-areas set larger than those of the through-bores 32a to 32e in the other five cells 29a to 29e. Among the through-bores 37j to 37m in the four cells 29j to 29m in the second cell group 37, the through bores 37l and 37m in the two cells 29l and 29m located in the vicinity of the rear pillar 15 have passage sectional-areas larger than those of the through-bores 37j and 37k in the other two cells 29j and 29k.

Figure 4:
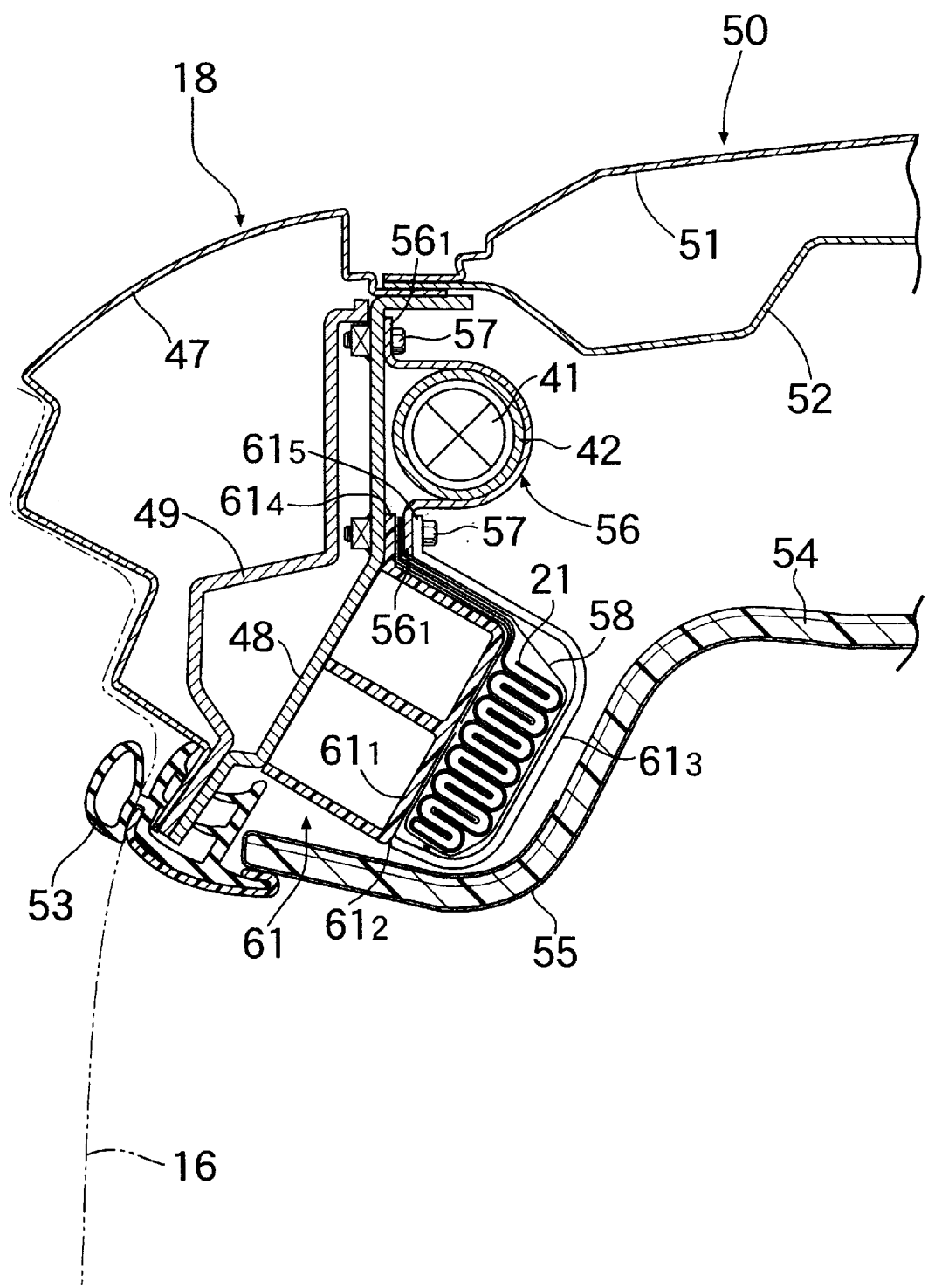
Figure 5:
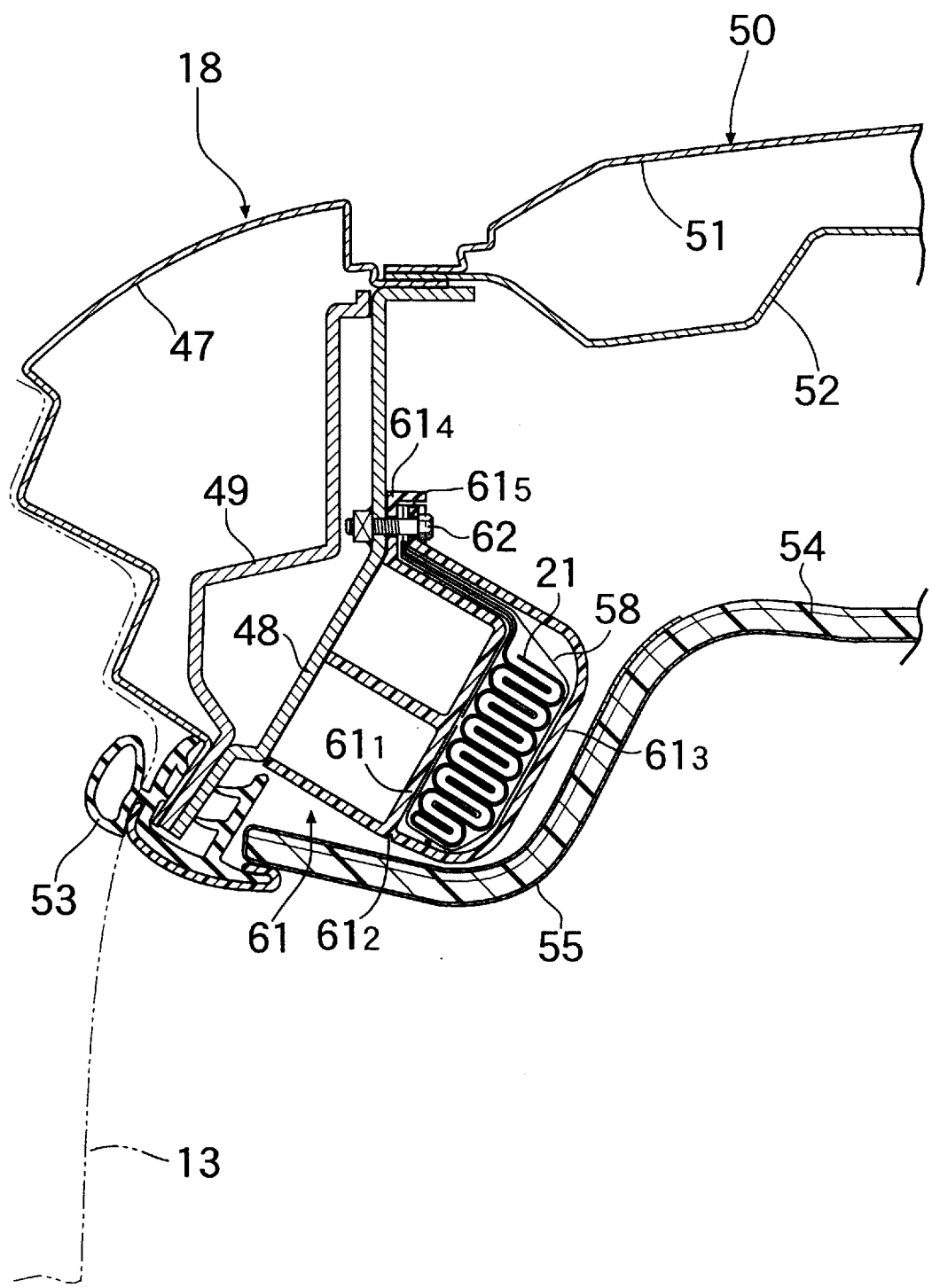
Figure 7:
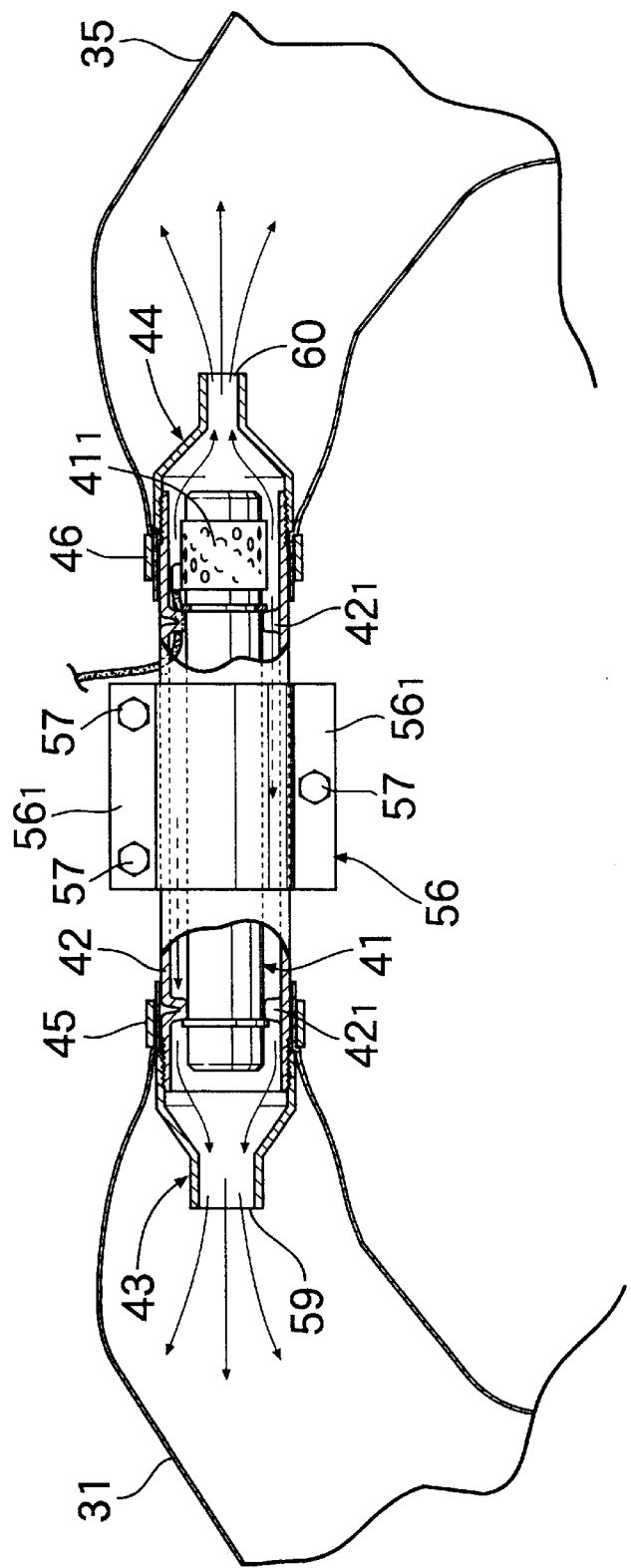
Figure 8:
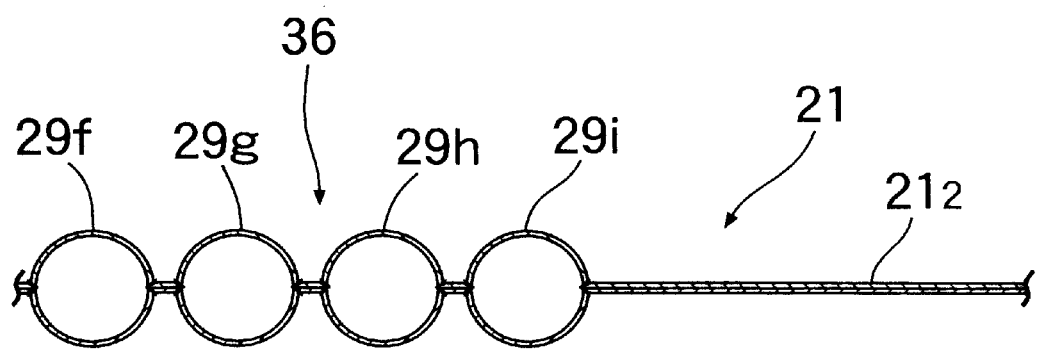

As shown in FIGS. 4, 5 and 7, an inflater 41 adapted to expand the air bag 21 by burning of a propellant is a generally cylindrical member, and has a high-pressure gas ejecting portion $41_1$ formed in the vicinity of one end thereof. The inflater 41 is supported in an inflater case 42, whose opposite ends open, through a plurality of supporting projections $42_1$ protruding on an inner surface of the inflater case 42. Funnel-shaped diffusers 43 and 44 constituting a portion of the inflater case 42 are fixed to the opposite ends of the inflater 41, and a high-pressure gas ejecting port 59 defined in a tip end of the diffuser 43 located in a front position has an opening area set larger than that of a high-pressure gas ejecting port 59 defined in a tip end of the diffuser 44 located in a rear position.

The front end of the inflater case 42, at which the front diffuser 43 is mounted, is fitted into the first high-pressure gas supply port 31 in the first cell group 36 of the air bag 21 and fixed thereto by a band 45. The rear end of the inflater case 42, at which the rear diffuser 44 is mounted, is fitted into the second high-pressure gas supply port 35 in the second cell group 37 of the air bag 21 and fixed thereto by a band 46. Therefore, the inflater 41 and the inflater case 42 having the inflater 41 accommodated therein are disposed above the non-expandable portion $21_2$ of the air bag 21 at such locations that they are sandwiched between the first and second high-pressure gas supply ports 31 and 35 in the first and second cell groups 36 and 37.

In this way, the high-pressure gas is supplied from the common inflater 41 to the first and second cell groups 36 and 37 and hence, the number of parts, the number of assembling steps, the weight and the cost can be reduced, as compared with a case where two inflaters are mounted in correspondence to the first and second cell groups 36 and 37. Moreover, since the inflater case 42 is disposed at such location that it is sandwiched between the first and second cell groups 36 and 37 of the air bag 21, it is possible to reduce the possibility that the occupant's body interferes with the inflater 41.

The roof side rail 18 is formed into a closed sectional shape by welding an outer member 47, an inner member 48 and a center member 49 to one another, and a roof 50 connected to the roof side rail 18 is formed by welding an outer member 51 and an inner member 52 to each other. A weather strip 53 is provided at a lower end of the roof side rail 18 to be able to abut against the rear door 16. A roof garnish 54 made of a synthetic resin is disposed to extend along the lower surface of the roof 50, and locked at its end edge to an end edge of a weather strip 53 which protrudes from the lower end of the roof side rail 18 toward a vehicle compartment. A lower surface of the roof garnish 54 opposed to the vehicle compartment is coated with a skin material 55 which is turned at the end edge of the roof garnish 54 to extend from the lower surface onto the upper surface. Thus, it is possible to prevent the end edge of the roof garnish 54 made of the synthetic resin from being broken and scattered upon application of a shock to the end edge of the roof garnish 54.

In place of carrying out the treatment for extending the end edge of the skin material 55 onto the upper surface of the roof garnish 54, an anti-scattering sheet may be stretched in the vicinity of the end edge of the roof garnish 54, or an anti-scattering coating is provided on the end edge of the roof garnish 54 and then, only the lower surface of the roof garnish 54 may be covered with the skin material 55. Even in such case, similar function and effect can be achieved.

A mounting bracket 56 is fitted over the central portion of the inflater case 42 having the inflater 41 accommodated therein, and is fastened to an upper portion of the inner member 48 of the roof side rail 18 by two bolts 57, 57 passed through a pair of flanges $56_1$, $56_1$ of the mounting bracket 56. At this time, both of the mounting bore 21e located in the upper portion of the non-expandable portion $21_2$ of the air bag 21 and an air bag holder 61 which will be described hereinafter are fastened commonly to the inner member 48 of the roof side rail 18 by the lower bolt 57.

Figure 9:
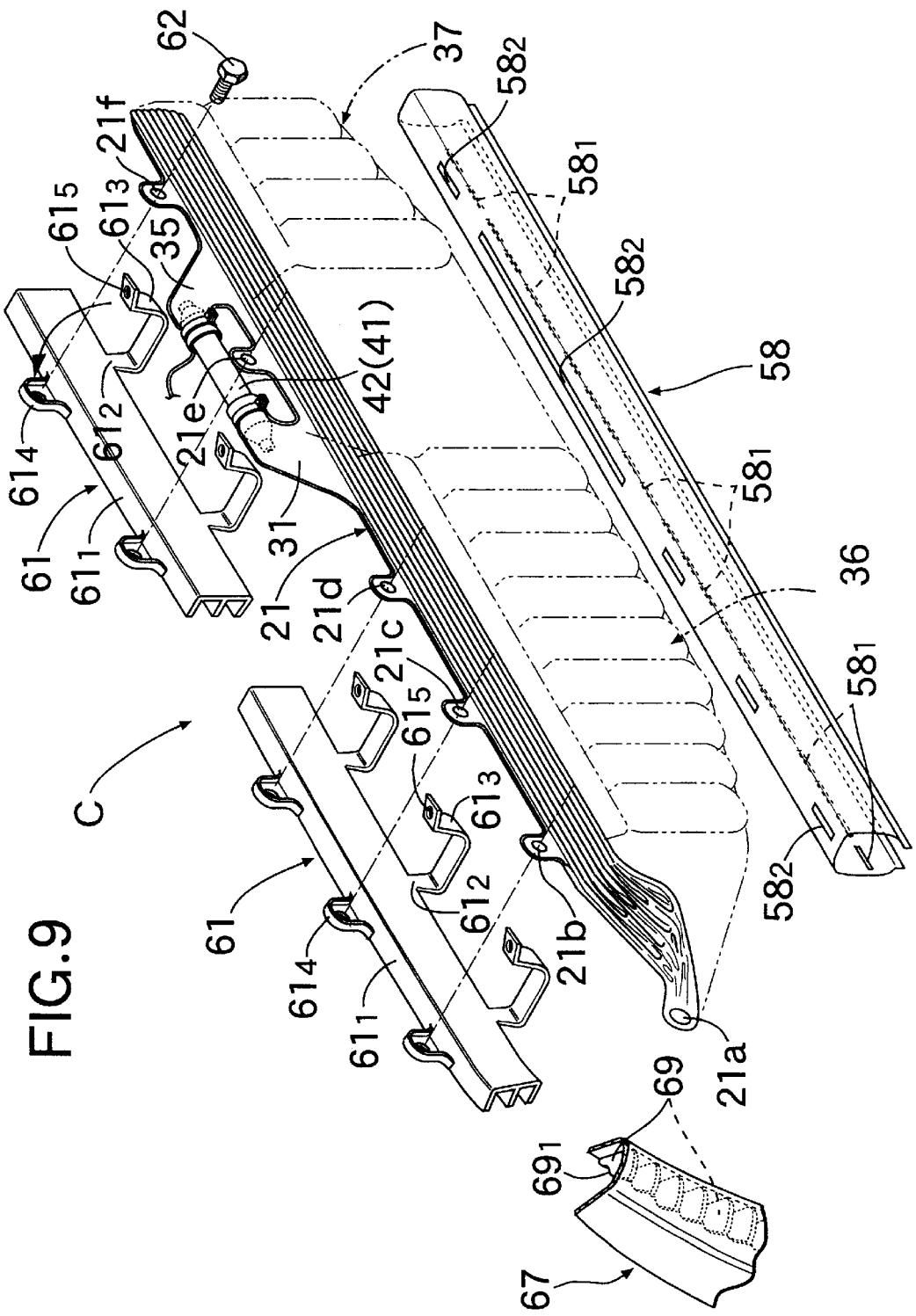

As can be seen from FIG. 9, the air bag 21 in a folded-up state is disposed within an air bag cover 58 formed of a non-woven fabric. The air bag cover 58 is made by rolling a rectangular piece of fabric into a cylindrical shape and sewing the cylindrical piece of fabric along its lower edge. Easily-breakable slits $58_1$ are defined in a perforated manner in that side face of the air bag cover 58 which is opposed to the roof side rail 18. The mounting bores 21a, 21b, 21c, 21d, 21e and 21f protruding from the upper end of the air bag 21 and the first and second high-pressure gas supply ports 31 and 35 protrude upwards through openings $58_2$ defined in the upper surface of the air bag cover 58.

As can be seen from FIGS. 5 and 9, an air bag holder 61 made of a synthetic resin is mounted along the lower portion of the inner member 48 of the roof side rail 18, and serves as base, when the folded-up air bag 21 is supported on the roof side rail 18. The air bag holder 61 is divided into a plurality of sections in a direction of the length of the folded-up air bag 21, e.g., into two sections: a section corresponding to the first cell group 36 in the air bag 21 and a section corresponding to the second cell group 37 in the air bag 21 in the embodiment.

The air bag holder 61 is a hollow member having a body portion $61_1$ formed into an E-shape in cross section, and has openable and closeable support arms $61_3$ integrally formed, the body portion 61, and support arms $61_3$ forming a unitary structure, in its portions corresponding to the mounting bores 21b, 21c, 21d and 21f of the air bag 21 with thin hinge portions $61_2$ formed therebetween. In a state in which the support arms $61_3$ have been closed, the air bag 21 enclosed in the air bag cover 58 is retained in a sandwiched manner between the support arms $61_3$ and the body portion $61_1$ and fastened to the inner member 48 of the roof side rail 18 by bolts 62 which are passed through flanges $61_4$ and $61_5$ provided on the body portion $61_1$ and the support arms $61_3$, respectively. At this time, the mounting bores 21b, 21c, 21d and 21f in the air bag 21 protruding from the air bag cover are fastened commonly. Only the flanges $61_4$ and $61_5$ of the body portion $61_1$, and the support arm $61_3$ corresponding to the mounting bore 21e located above the non-expandable portion $21_2$ of the air bag 21 are fastened commonly by another bolt 57 (see FIG. 4) for fixing the mounting bracket 56 of the inflater 41.

The flanges $61_5$ provided at the tip ends of the support arms $61_3$ of the air bag holder 61 are adapted to be resiliently fitted into the flanges $61_4$ provided on the body portion $61_1$. If the flanges $61_4$ and $61_5$ are fitted in a state in which the folded-up air bag 21 has been retained between the body portion $61_1$ and the support arms $61_3$ of the air bag holder 61, the air bag holder 61 and the air bag 21 can be integrally fixed temporarily, whereby the efficiency of fixing them to the roof side rail 18 can be enhanced.

The support arms $61_3$ of the air bag holder 61 and the mounting bores 21b to 21f in the air bag 21 are fastened commonly by utilizing the bolts 62 and 57 for fixing the air bag holder 61 to the rood side rail 18, as described above and hence, the number of the bolts 62 and 57 can be reduced to a minimum to lessen the number of parts and the number of assembling steps. Moreover, the support arms $61_3$ for supporting the air bag 21 to extend along the air bag holder 61 are formed integrally to make a single unitary structure, with the air bag holder 61 and hence, it is unnecessary to mount a special member for supporting the air bag 21 on the air bag holder 61. This can also contribute to a reduction in number of parts.

Figure 6:
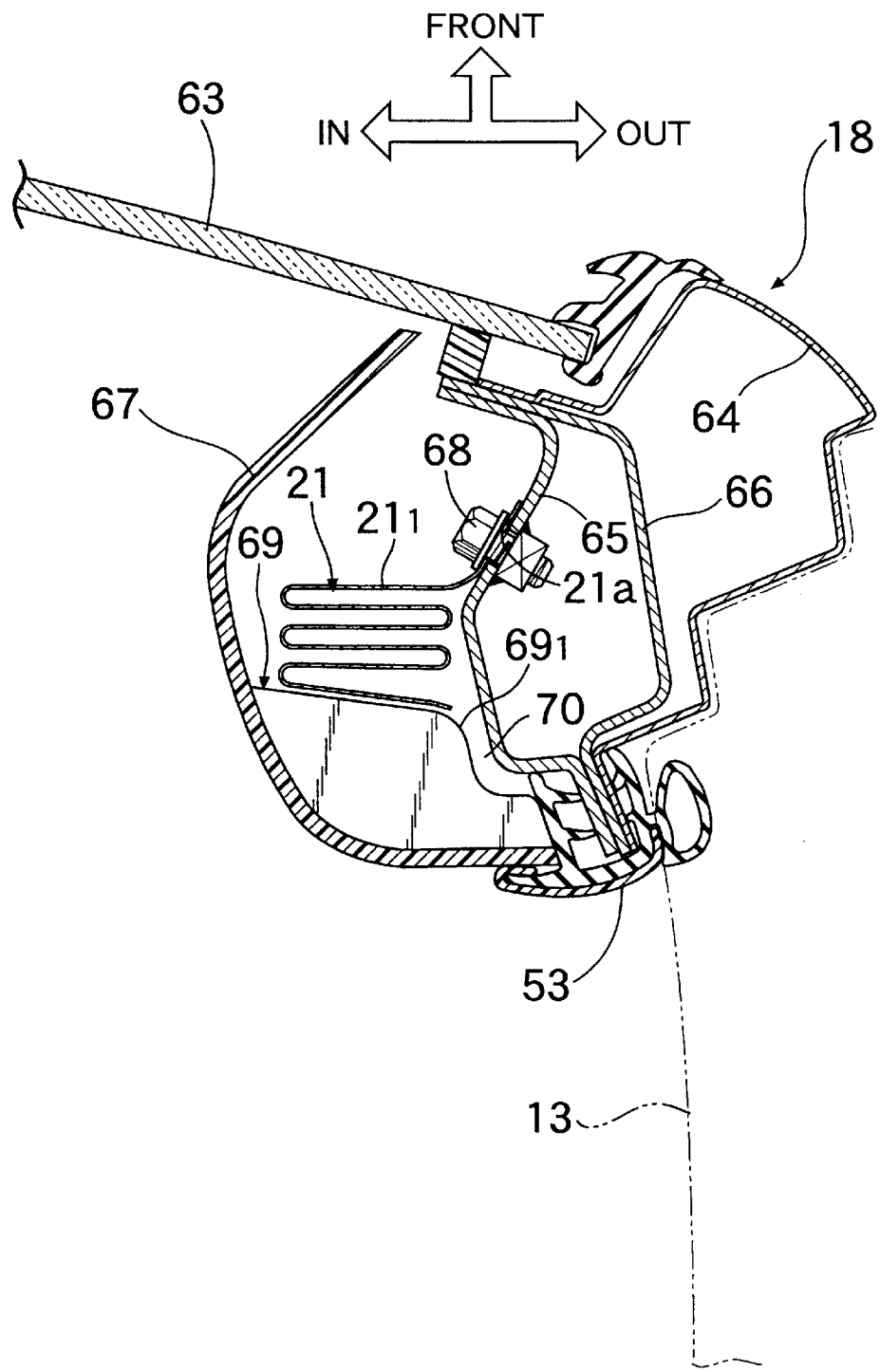

As shown in FIGS. 6 and 9, the front pillar 11 for supporting the end of the front glass 63 is formed into the closed sectional shape by welding the outer member 64, the inner member 65 and the center member 66 to one another. The weather strip 53 is mounted at the rear end of the front pillar 11, and the front pillar garnish 67 is also mounted at the rear end of the front pillar 11 to cover the inner member 65. The non-expandable portion $21_1$ of the air bag 21 protruding from the air bag cover 58 is fastened to the inner member 65 of the front pillar 11 by the bolt 68 passed through the mounting bore 21a defined in the non-expandable portion $21_1$.

A large number of ribs 69 are integrally formed, to make a single unitary structure, as energy absorbing members at predetermined distances vertically spaced apart from one another on that inner surface of the front pillar garnish 67 which faces rearwards of the air bag 21. A passage 70 is defined between the inner member 65 of the front pillar 11 and the ribs 69 and has one end facing the air bag 21 and the other end facing the weather strip 53. Each of surfaces $69_1$ of the ribs 69 opposed to the passage 70 is formed into a smooth curved surface having no sharp edges.

Figure 10A:
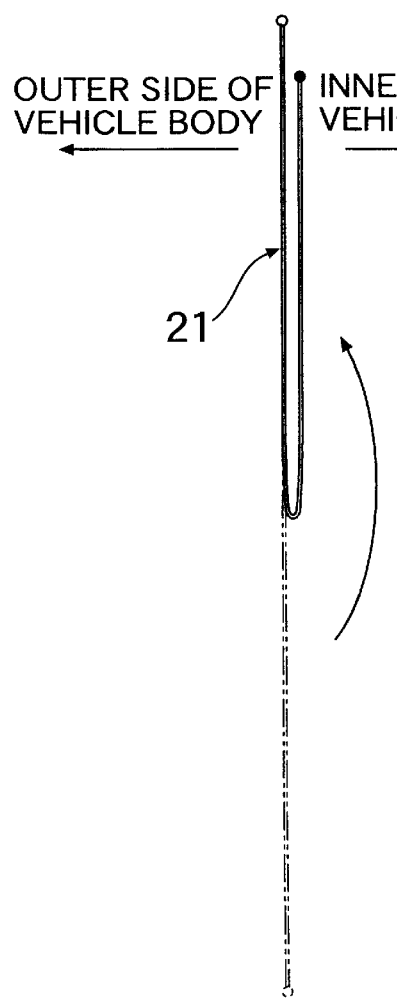
FIGS. 10A to 10C are diagrams for explaining the operation during folding of the air bag.
Figure 10B:
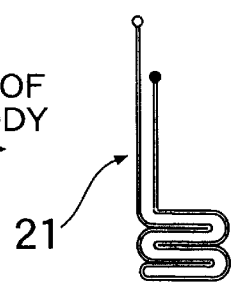
Figure 10C:
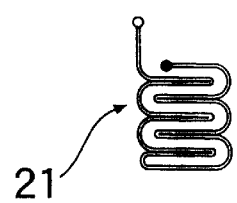

The air bag 21 is folded by a procedure shown in FIGS. 10A to 10C. In FIGS. 10A to 10C, an open circle indicates the base end (upper end) of the air bag, and a black dot indicates the tip end (lower end) of the air bag 21. First, lower half of the air bag 21 is folded back in the direction of the inside of the vehicle body and superposed on the inner side of the vehicle body, as shown in FIG. 1OA. At this time, upper and lower halves of the air bag folded double may be temporarily partially fixed by an adhesive which is easily peeled off, or by a thread which is easily broken. Subsequently, the air bag 21 folded double is folded in a vertically zigzag manner to provide a reduced height, as shown in FIG. 10B, and folded up finally into a shape shown FIG. 10C. The air bag 21 folded up in this manner is enclosed in the air bag cover 58 and retained in the folded-up configuration.

The operation of this embodiment will be described below.

When an acceleration sensor has detected an acceleration equal to or larger than a predetermined value due to the side collision of the vehicle, the inflater 41 is ignited by a command from an air bag deployment control means, and a high-pressure gas generated by the burning of the propellant is ejected from the high-pressure gas ejecting portion $41_1$ of the inflater 41 into the inflater case 42. The high-pressure gas ejected into the inflater case 42 is supplied through the high-pressure gas ejecting port 59 in the front diffuser 43 into the first high-pressure gas supply port 31 in the first cell group 36 of the air bag 21, and flows from the first high-pressure gas supply port 31 via the first high-pressure gas supply passage 30 and the nine through-bores 29a to 29i into the nine cells 29a to 29i to expand the nine cells 29a to 29i. At the same time, the high-pressure gas ejected from the inflater 41 into the inflater case 42 is supplied through the high-pressure gas ejecting port 60 in the rear diffuser 44 into the second high-pressure gas supply port 35 in the second cell group 37 of the air bag 21, and flows from the second high-pressure gas supply port 35 via the second high-pressure gas supply passage 34 and the four through-bores 32j to 32m into the four cells 29j to 29m to expand the four cells 29j to 29m.

Figure 12:
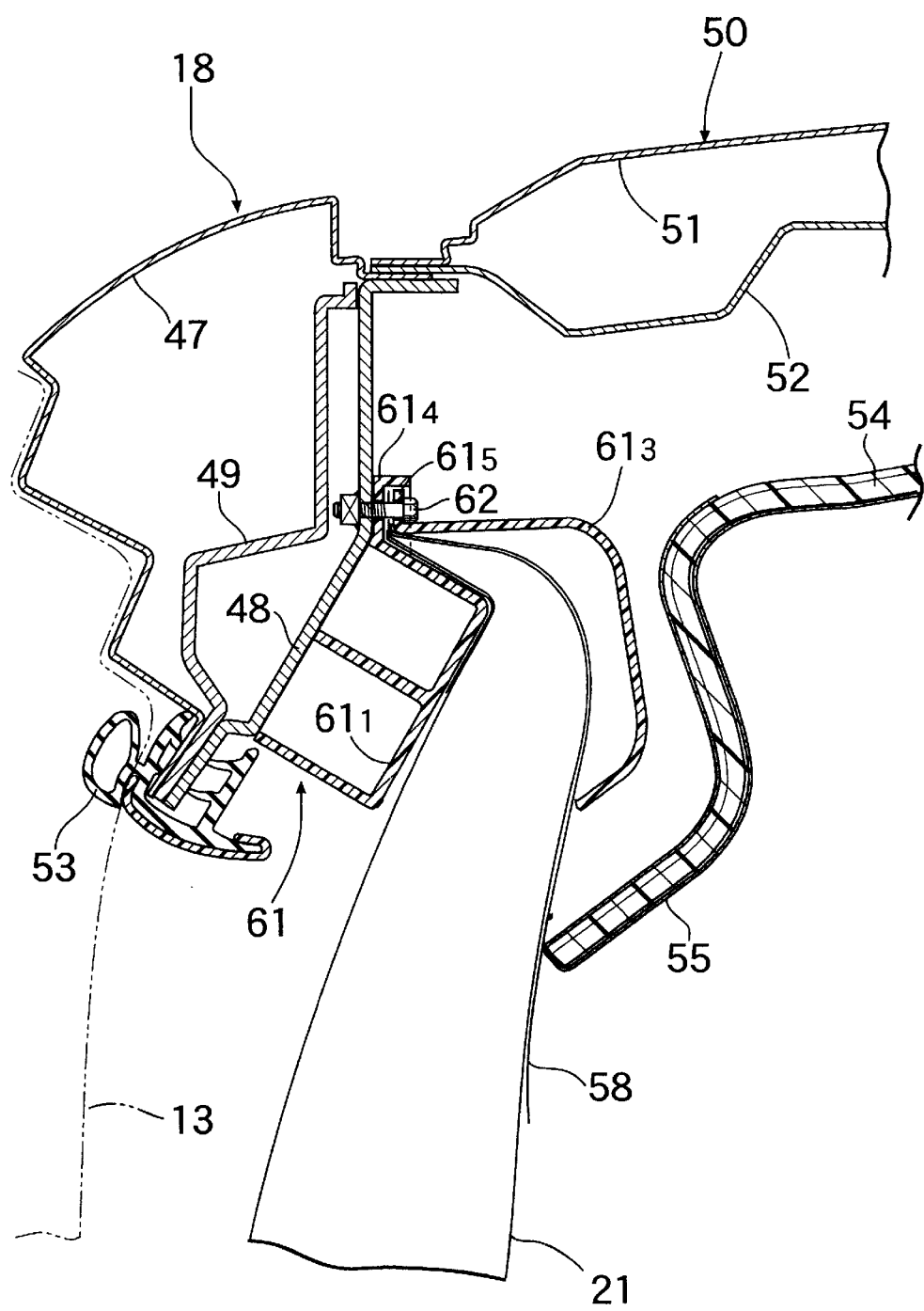
Figure 13:
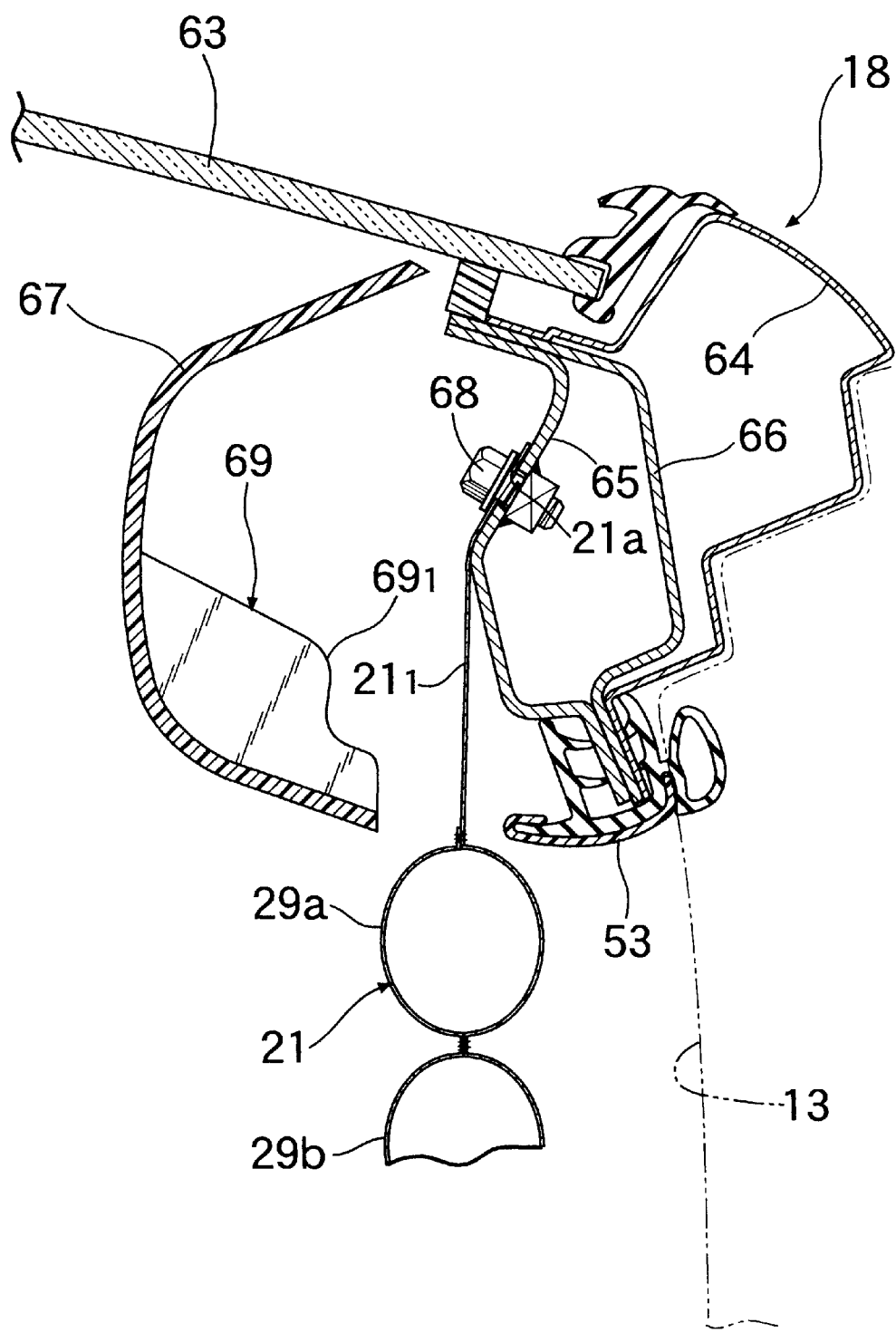

In such course, the hinge portions $61_2$ of the air bag holder 61 are broken by the pressure of the expanded first and second cell groups 36 and 37, whereby the support arms $61_3$ are cut away from the body portion 61, as shown in FIG. 12, and the slits 58₁ (see FIG. 9) in the air bag cover 58 covering the folded air bag 21 are broken to enable the free expansion of the air bag 21. When the air bag 21 is further expanded, the end edge of the roof garnish is pushed down by the expansion pressure, whereby the engagement of the roof garnish 54 with the weather strip 53 is released to provide an opening. Therefore, the air bag 21 passed through such opening is deployed downwards into the vehicle compartment (see FIG. 2).

In the course of expanding the air bag 21 in the above manner, the non-expandable portion 21₁ at the front end of the air bag 21, pulled to the expanded first cell group 36, enters the passage 70 defined between the inner member 65 of the front pillar 11 and the ribs 69 of the front pillar garnish 67. As a result, the front pillar garnish 67 is deformed by the pressure received from the non-expandable portion 21₁ of the air bag 21 and disengaged from the weather strip 53, whereby the air bag 21 is deployed downwards through the resulting opening into the vehicle compartment. At this time, the non-expandable portion 21₁ of the air bag 21 is guided to the ribs 69 of the front pillar garnish 67, but it is possible to reliably prevent the air bag 21 from being caught on the ribs 69 to impede the smooth deployment of the air bag 21 or to damage the air bag.

In the above-described embodiment, the non-expandable portion 21₁ of the air bag 21 is accommodated between the front pillar 11 and the front pillar garnish 67, but an expandable cell may be accommodated in the non-expandable portion 21₁.

Figure 11D:
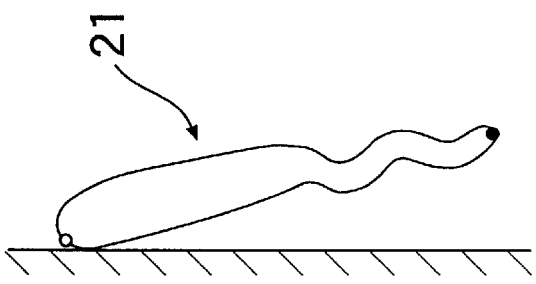
FIGS. 11A to 11D are diagrams for explaining the operation during deployment of the air bag.
Figure 11C:
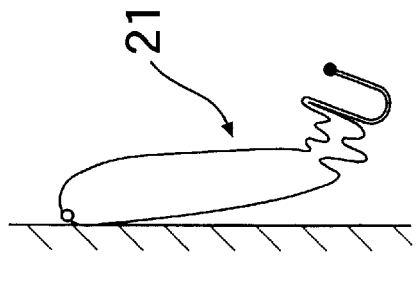
Figure 11B:
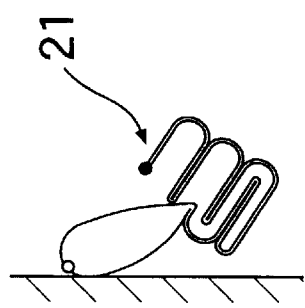
Figure 11A:
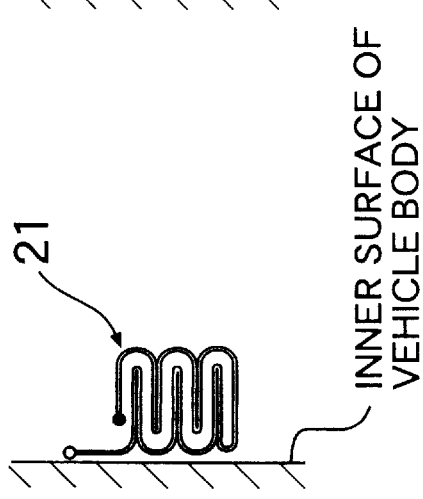

FIGS. 11A to 11D diagrammatically show the course of expansion of the air bag 21, wherein an open circle indicates the base end of the air bag 21, and a black dot indicates the tip end of the air bag 21. As already described with reference to FIGS. 10A to 10C, the air bag 21 is first folded double so that the tip end thereof extends to the inner side of the vehicle body at its tip end portion and then folded up in the vertically zigzag manner. Therefore, when the expansion of the air bag 21 in the folded-up state shown in FIG. 11A is started at its base end, as shown in FIG. 11B, the tip end of the air bag 21 is moved so that it falls in a direction away from the inner surface of the vehicle body (toward the central portion of the vehicle compartment), as shown in FIG. 11C. As a result, the air bag 21 can be deployed correctly, as shown in FIG. 11D, and it is possible to prevent such a deployment failure such as the tip end of the air bag 21 is caught on the inner surface of the vehicle body causing the air bag to fold at an intermediate portion thereof.

The air bag cover 58 covering the folded-up air bag 21 also has a function to prevent the tip end of the deployed air bag from being caught on the inner surface of the vehicle body thereby promoting the correct deployment. More specifically, the slits 58₁ in the air bag cover 58 adapted to be broken upon the deployment of the air bag 21 are defined on the side opposed to the inner surface of the vehicle body. Therefore, when the slits 58₁ are broken to provide the opening, the resulting reaction causes the air bag to be swung like a pendulum about the base end toward the central portion of the vehicle compartment. As a result, the distance between the tip end of the air bag 21 and the inner surface of the vehicle body is increased, whereby it is possible to prevent the tip end from being caught on the inner surface of the vehicle body to cause the deployment failure.

When the air bag 21 is deployed in the above manner, the high-pressure gas generated by the inflater 41 is distributed to the first cell group 36 and the second cell group 37 by the front and rear diffusers 43 and 44. In this case, the high-pressure gas can be distributed in appropriate amounts to the first and second cell groups 36 and 37, respectively, to make uniform the time required for the deployment and the internal pressure in various portions of the air bag 21, because the opening area of the high-pressure gas ejecting port 59 in the diffuser 43 corresponding to the first cell group 36 having the larger volume is larger and the opening area of the high-pressure gas ejecting port 60 in the diffuser 44 corresponding to the second cell group 37 having the smaller volume is smaller.

In addition, since the sectional areas of the passageways of the through-bores 32f to 32i in four 29f to 29i of the nine cells 29a to 29i of the first cell group 36, which are located in the vicinity of the center pillar 12, are large and the sectional areas of the passageways of the through-bores 37l and 37m in two 29l and 29m of the four cells 29j to 29m of the second cell group 37, which are located in the vicinity of the rear pillar 15, is large, a sufficient amount of the high-pressure gas can be supplied to the cells 29f to 29i, 29l and 29m located in the vicinity of the center pillar 12 and the rear pillar 15, requiring a large shock buffering performance as compared with the other portions, to promptly and reliably expand the air bag.

Further, the air bag 21 is divided into the first and second cell groups 36 and 37 which are independent from each other, so that the high-pressure gas does not flow from one of the first and second cell groups 36 and 37 to the other. Therefore, even if one of the first and second cell groups 36 and 37 is damaged to cause the leakage of the high-pressure gas, this influence can be prevented from being exerted to the other of the first and second cell groups 36 and 37. Yet further, suppose that the air bag includes a single cell group, and the high-pressure gas is supplied from one end of the single cell group, a time lag is generated by the time when the high-pressure gas reaches the other end of the cell group, whereby it is difficult to promptly deploy the entire air bag. In this embodiment, however, the non-uniform deployment of the air bag due to the time lag in supplying of the high-pressure gas is prevented, because the air bag is divided into the first and second cell groups 36 and 37 having the first and second high-pressure gas supply ports 31 and 35, respectively.

When the acceleration generated due to the side collision of the vehicle is equal to or smaller than the predetermined value, the occupant restraint device C is not operated. However, when the occupant secondarily collides against the end edge of the roof garnish 54 facing the roof side rail 18 due to a shock generated upon the side collision of the vehicle, the hollow body portion 61₁ of the air bag holder 61 made of the synthetic resin is crushed to buffer the shock, but also the folded air bag 21 exhibits a function to enhance the shock buffering effect. In this way, the air bag holder 61 supporting the air bag 21 on the roof side rail 18 has a function to act as a shock absorbing member and hence, the increases in number of parts and in cost can be inhibited, as compared with a case where the shock absorbing member is provided separately.

Figure 14:
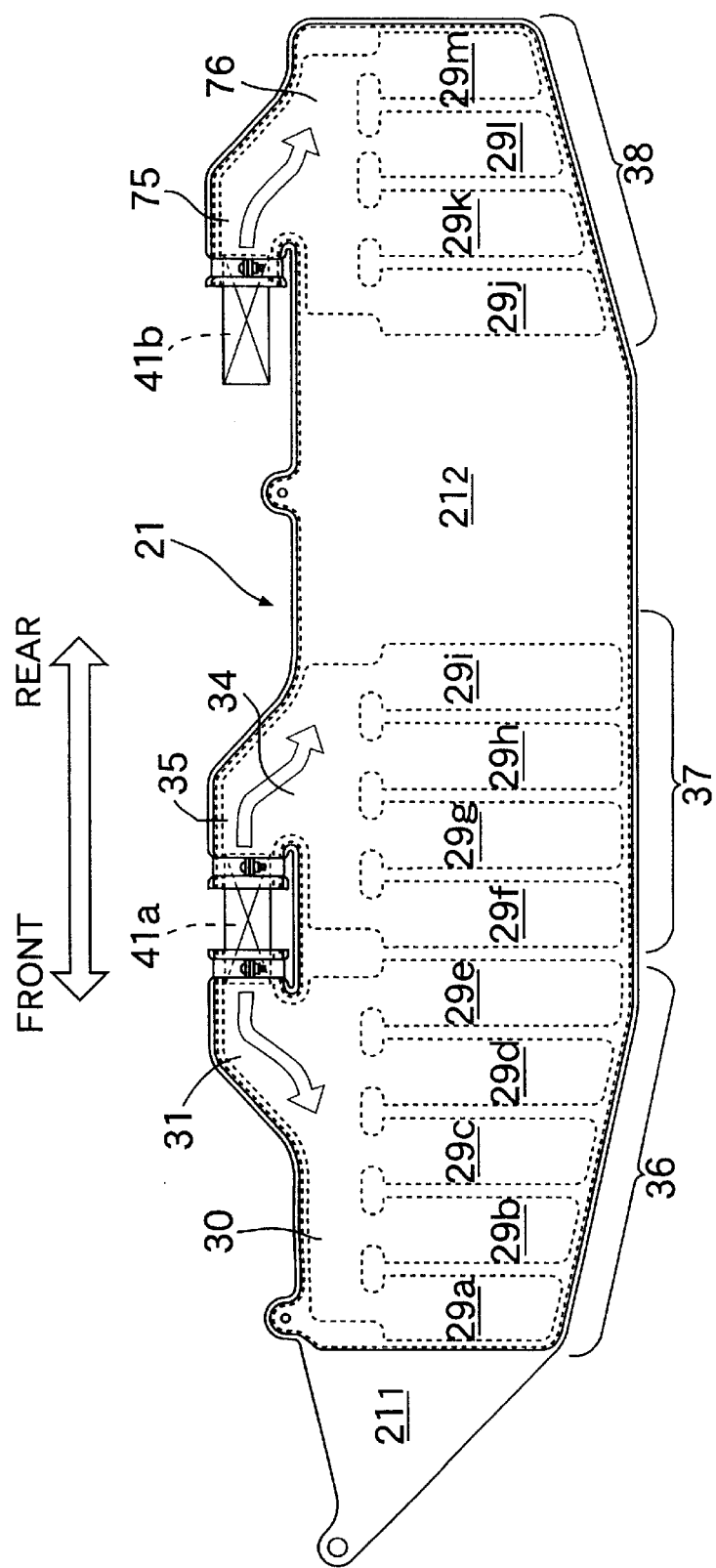
FIG. 14 is a view similar to FIG. 3, but according to a second embodiment of the present invention.

A second embodiment of the present invention will be described with reference to FIG. 14.

An air bag 21 in the second embodiment includes a first cell group 36 and a second cell group 36 which are adjacent each other, and a third cell group 38 provided at the rear of the second cell group 37 with a non-expandable portion 21₁ interposed therebetween. The first cell group 36 is comprised of a first high-pressure gas supply port 31, a first high-pressure gas supply passage 30 and five cells 29a, 29b, 29c, 29d and 29e, and the second cell group 37 is comprised of a second high-pressure gas supply port 35, a second high-pressure gas supply passage 34 and four cells 29f, 29g, 29h and 29i. The third cell group 38 is comprised of a third high-pressure gas supply port 75, a third high-pressure gas supply passage 76 and four cells 29j, 29k, 29l and 29m. A high-pressure gas is supplied from longitudinally opposite ends of a first inflater 41a into the first and second high-pressure gas supply ports 31 and 35 in the first and second cell groups 36 and 37, and a high-pressure gas is supplied from a second inflater 41b into the third high-pressure gas supply port 75 in the third cell group 38.

In the second embodiment, the first and second cell groups 36 and 37 are formed in a front portion of the air bag 21, and are independent from each other, and thereby the high-pressure gas does not flow from one of the first and second cell groups 36 and 37 to the other. Therefore, even according to the second embodiment, it is possible to prevent the influence of the damage of one of the first and second cell groups 36 and 37 from being exerted to the other, and to reliably deploy the first and second cell groups 36 and 37 without a lag by the common first inflater 41a.

Figure 15:
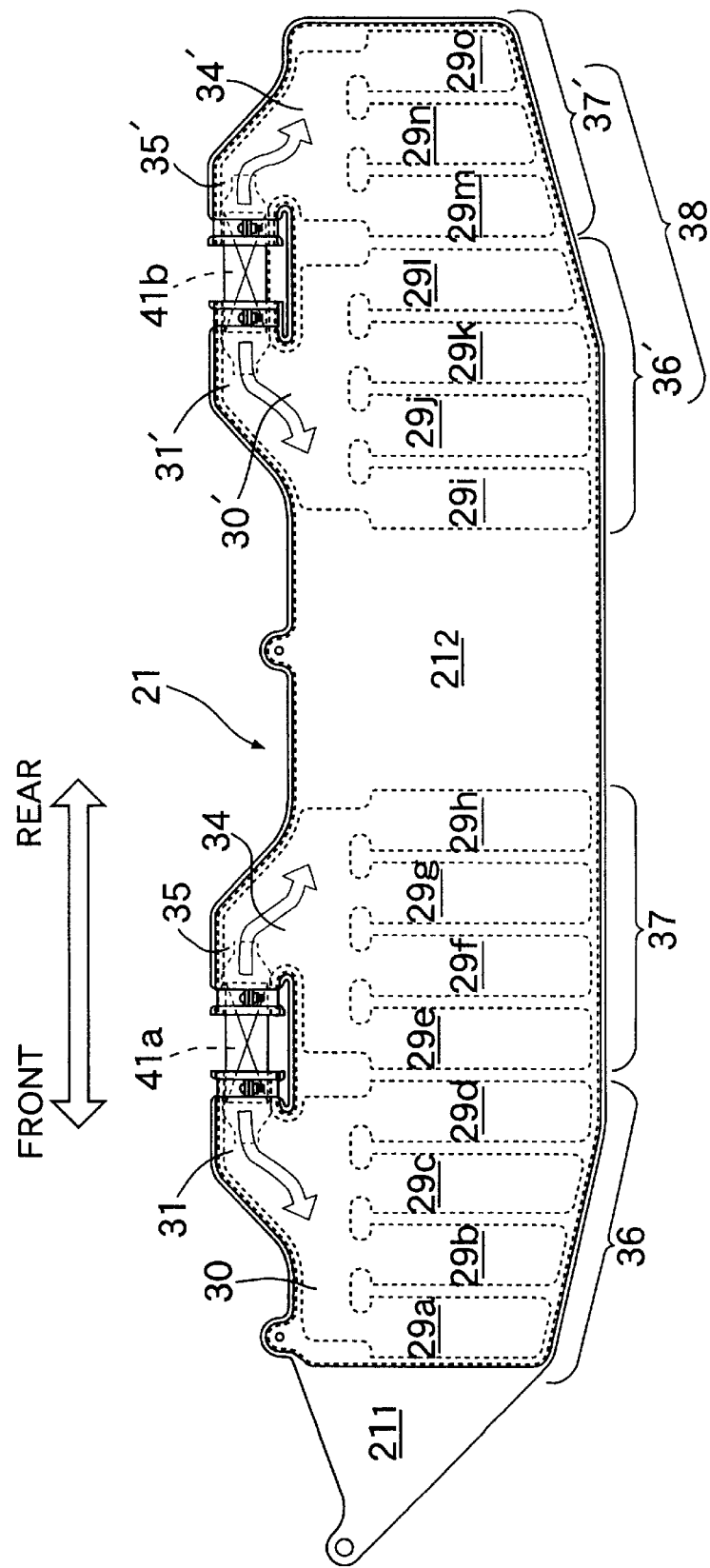
FIG. 15 is a view similar to FIG. 3, but according to a third embodiment of the present invention.

A third embodiment of the present invention will now be described with reference to FIG. 15.

An air bag 21 in the third embodiment includes a third cell 38 which is similar to that of the air bag 21 in the second embodiment, but divided into a first cell subgroup 36' and a second cell subgroup 37'. A high-pressure gas is supplied from a second inflater 41b through a first high-pressure gas supply port 31' and a first high-pressure gas supply passage 30' to the first cell subgroup 36', and also supplied from the second inflater 41b through a second high-pressure gas supply port 35' and a second high-pressure gas supply passage 34' to the second cell subgroup 37'.

According to the third embodiment, the same function and effect as those of the front first and second cell groups 36 and 37 can be exhibited by the rear first and second cell subgroups 36' and 37'.

Figure 16:
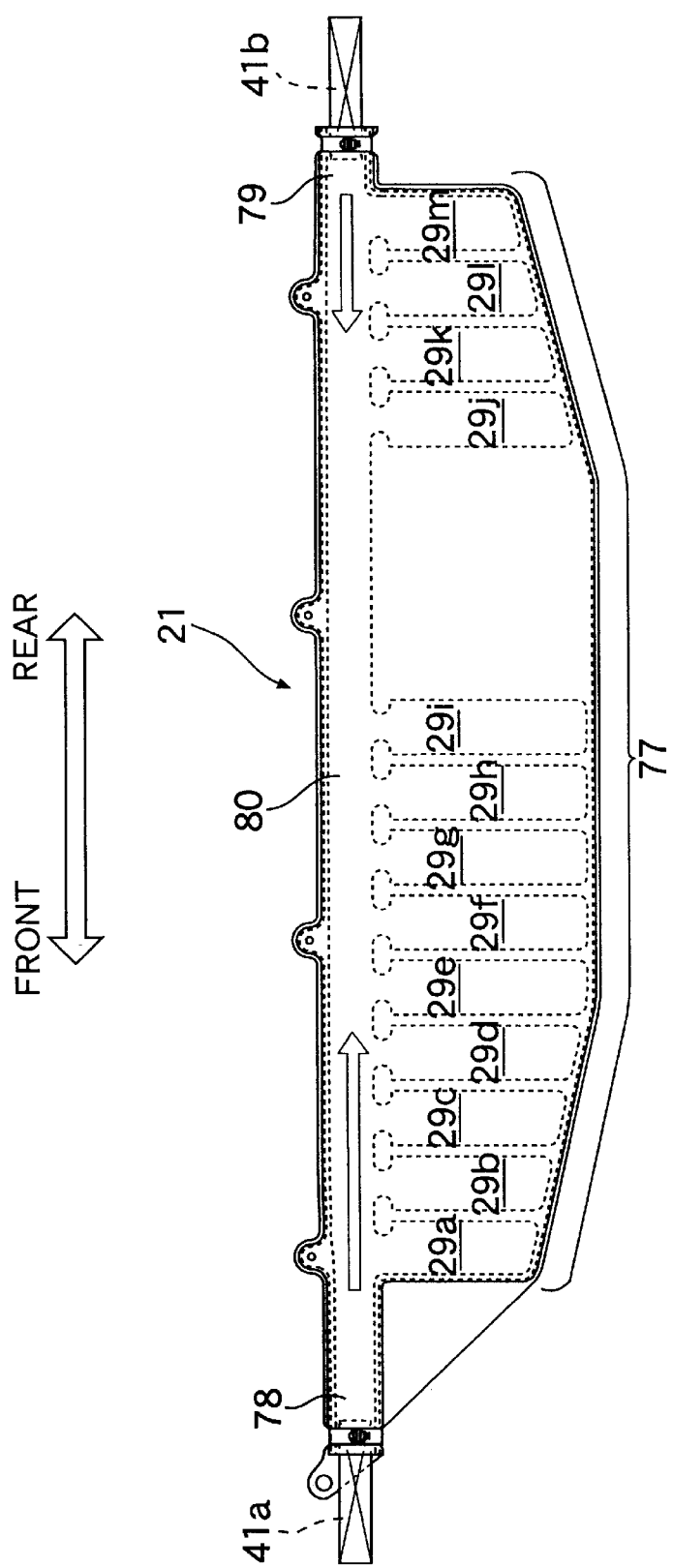
FIG. 16 is a view similar to FIG. 3, but according to a fourth embodiment of the present invention.

A fourth embodiment of the present invention will now be described with reference to FIG. 16.

Thirteen cells 29a, 29b, 29c, 29d, 29e, 29f, 29g, 29h, 29i, 28j, 29k, 29l and 29m in an air bag 21 in the fourth embodiment constitute a single cell group 77. A high-pressure gas is supplied from a first inflater 41a to a first high-pressure gas supply port 78 at a front end of the cell group 77, and a high-pressure gas is supplied from a second inflater 41b to a second high-pressure gas supply port 79 at a rear end of the cell group 77. A common high-pressure gas supply passage 80 connecting the first and second high-pressure gas supply ports 78 and 79 to each other communicates with the thirteen cells 29a to 29m.

According to the fourth embodiment, the high-pressure gas can be supplied from opposite ends of the air bag 21 to promptly and uniformly expand the entire air bag 21. Moreover, even when a portion of the cell group 77 is damaged, the high-pressure gas is necessarily supplied from the first inflater 41a or the second inflater 41b to the cells 29a, 29b, 29c, 29d, 29e, 29f, 29g, 29h, 29i, 29j, 29k, 29l, 29m located in front and rear of the damaged portion. Therefore, the expansion of the air bag 21 can be achieved without hindrance, leading to an enhanced reliability.

Figure 17:
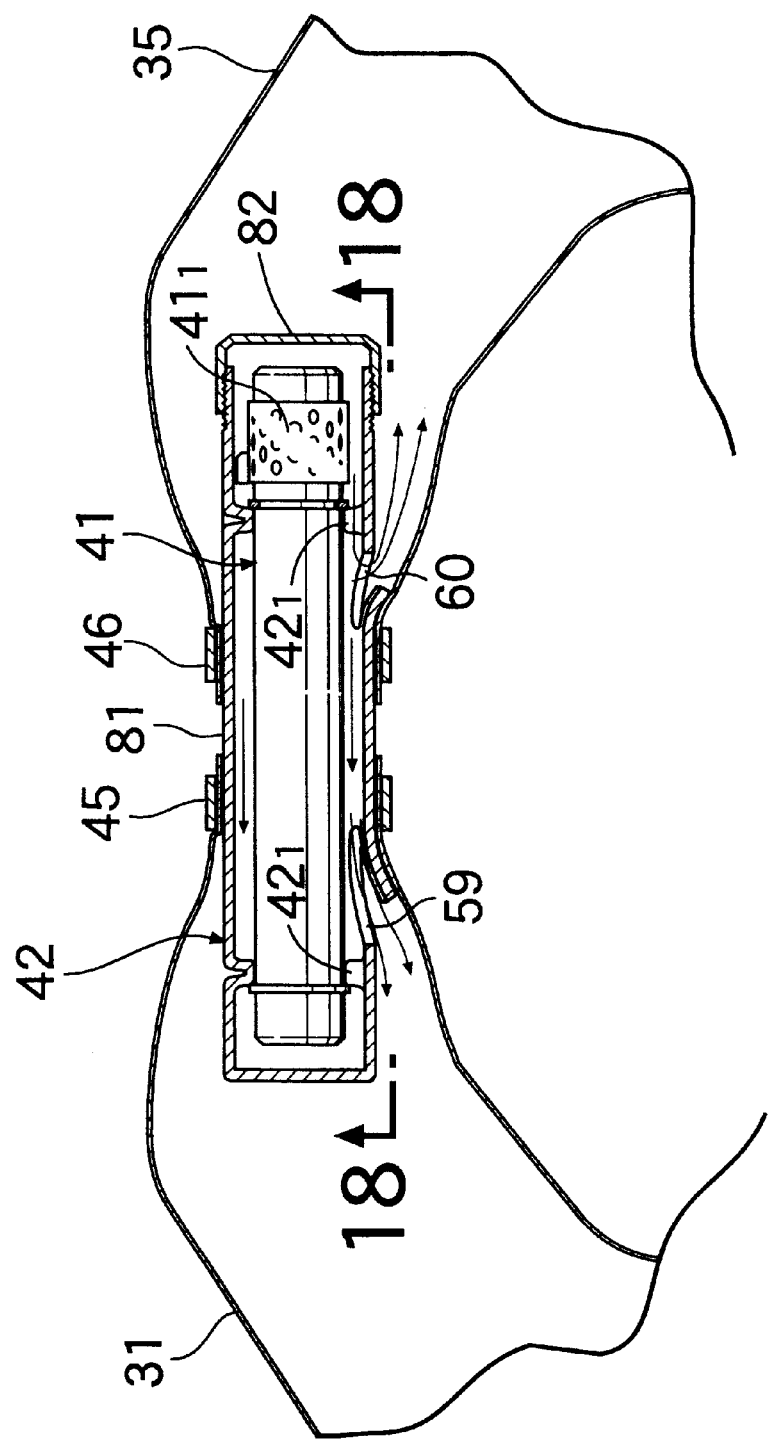
FIGS. 17 and 18 show a fifth embodiment of the present invention.
Figure 18:
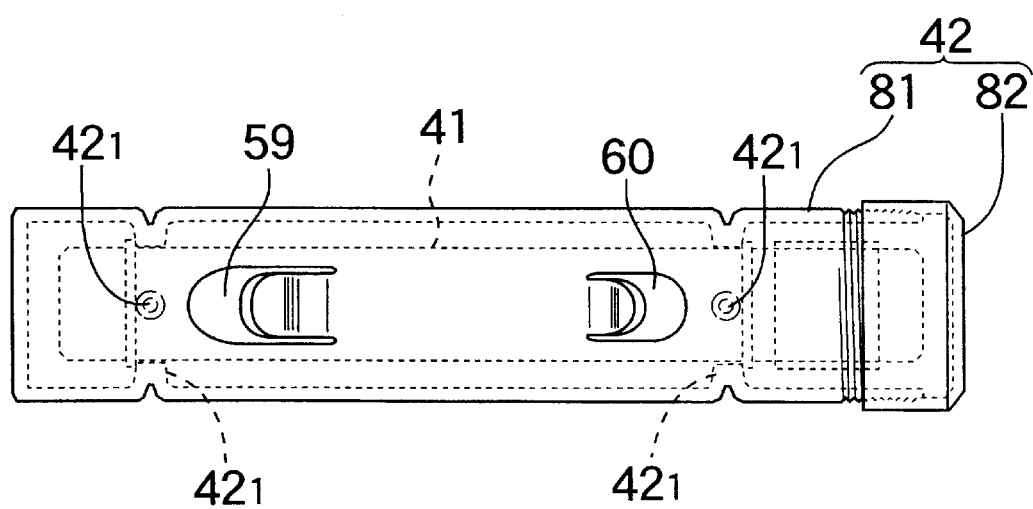

A fifth embodiment of the present invention will now be described with reference to FIGS. 17 and 18.

An inflater case 42 in the fifth embodiment includes a bottomed cylindrical body portion 81 closed at one end thereof and having an inflater 41 accommodated therein, and a cap 82 adapted to close an opening at the other end of the body portion 81. High-pressure gas ejecting ports 59 and 60 formed of notches are defined in the opposite ends of the body portion 81 of the inflater case 41, and first and second high-pressure gas supply ports 31 and 35 in the air bag 21 are fixed by bands 45 and 46 to cover the ejecting ports 59 and 60. The amount of high-pressure gas ejected can be regulated to any value by rising the notches forming the high-pressure gas ejecting ports 59 and 60 to change the opening area.

In the fifth embodiment, the two high-pressure gas ejecting ports 59 and 60 are provided in the inflater case 42 having the inflater 41 accommodated therein, and are connected to the two high-pressure gas supply ports 31 and 35 in the air bag 21, respectively. Therefore, even according to the fifth embodiment, the high-pressure gas ejected from the single inflater 41 can be reliably supplied to the plurality of high-pressure gas supply ports 31 and 35, thereby contributing to the reductions in number of part and in cost.

Figure 19:
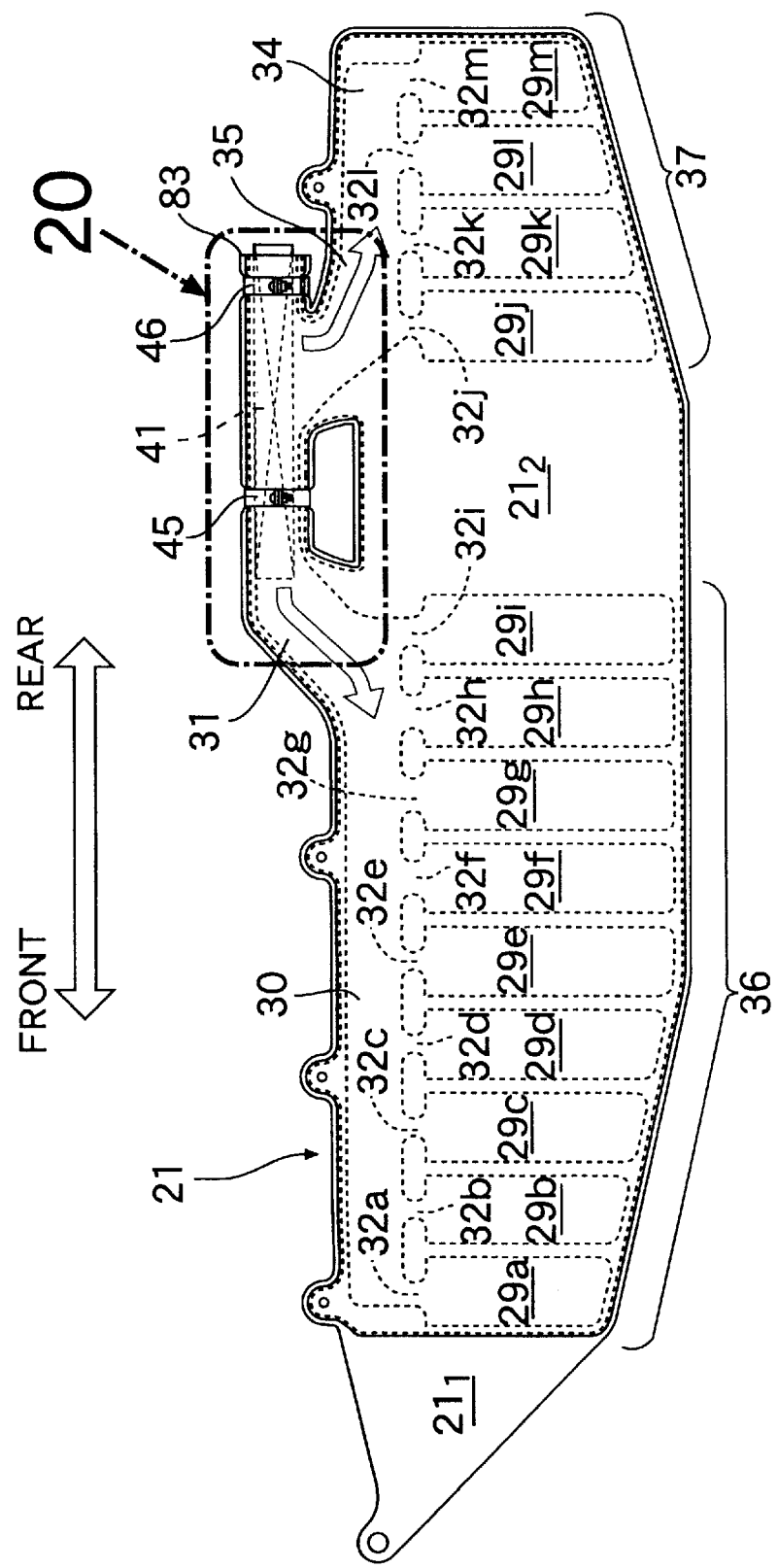
FIGS. 19 and 20 show a sixth embodiment of the present invention.
Figure 20:
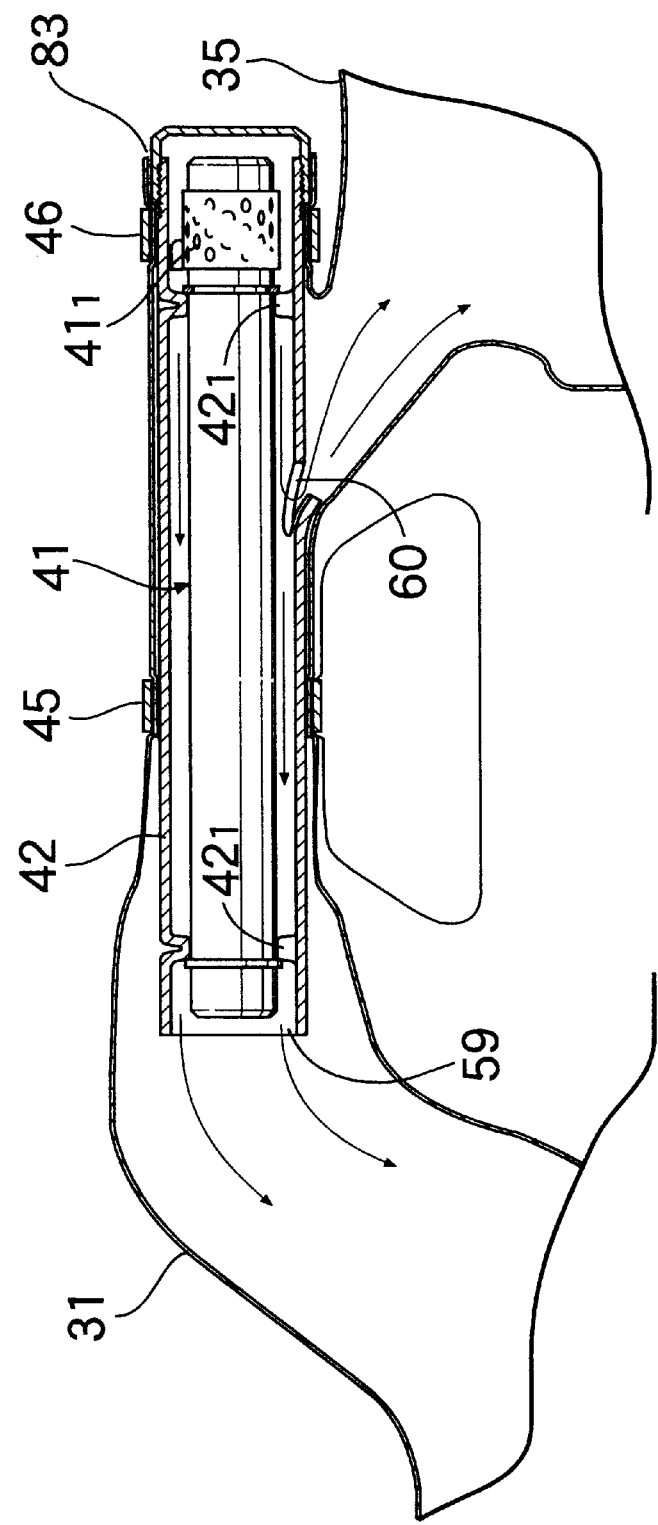

A sixth embodiment of the present invention will now be described with reference to FIGS. 19 and 20.

An inflater case 42 in the sixth embodiment is a bottomed cylindrical member which is closed at one end thereof and in which an inflater 41 is accommodated. An opening in the other end of the inflater case 42 is utilized, as it is, as a high-pressure gas ejecting port 59, and a notch made at the one end of the inflater case 42 is used as a high-pressure gas ejecting port 60. A first high-pressure gas supply port 31 in a first cell group 36 and a second high-pressure gas supply port 35 in a second cell group 3 of an air bag 21 communicate with each other, and the inflater 41 is inserted between the first and second high-pressure gas supply ports 31 and 35 from an inflater inserting opening 83 defined in the vicinity of the second high-pressure gas supply port 35. An intermediate portion of the inflater case 42 is clamped by a band 45 to inhibit the communication between the first and second high-pressure gas supply ports 31 and 35 in the air bag 21, and a rear end of the inflater case 42 is clamped by a band 46 to close the inflater inserting opening 83 in the air bag 21. Even according to the sixth embodiment, the same function and effect as those in the fourth and fifth embodiments can be achieved.

Figure 21:
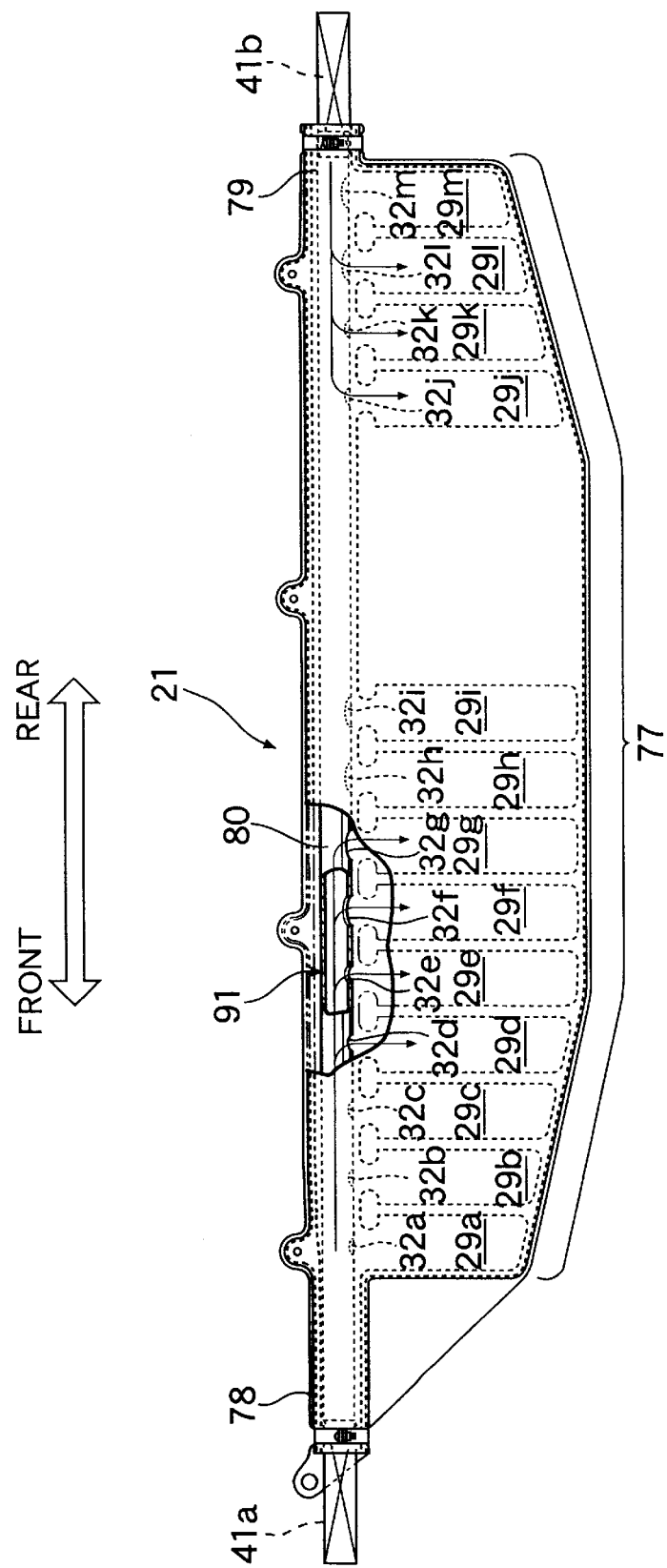
FIG. 21 is a view similar to FIG.3, but according to a seventh embodiment of the present invention.
Figure 22:
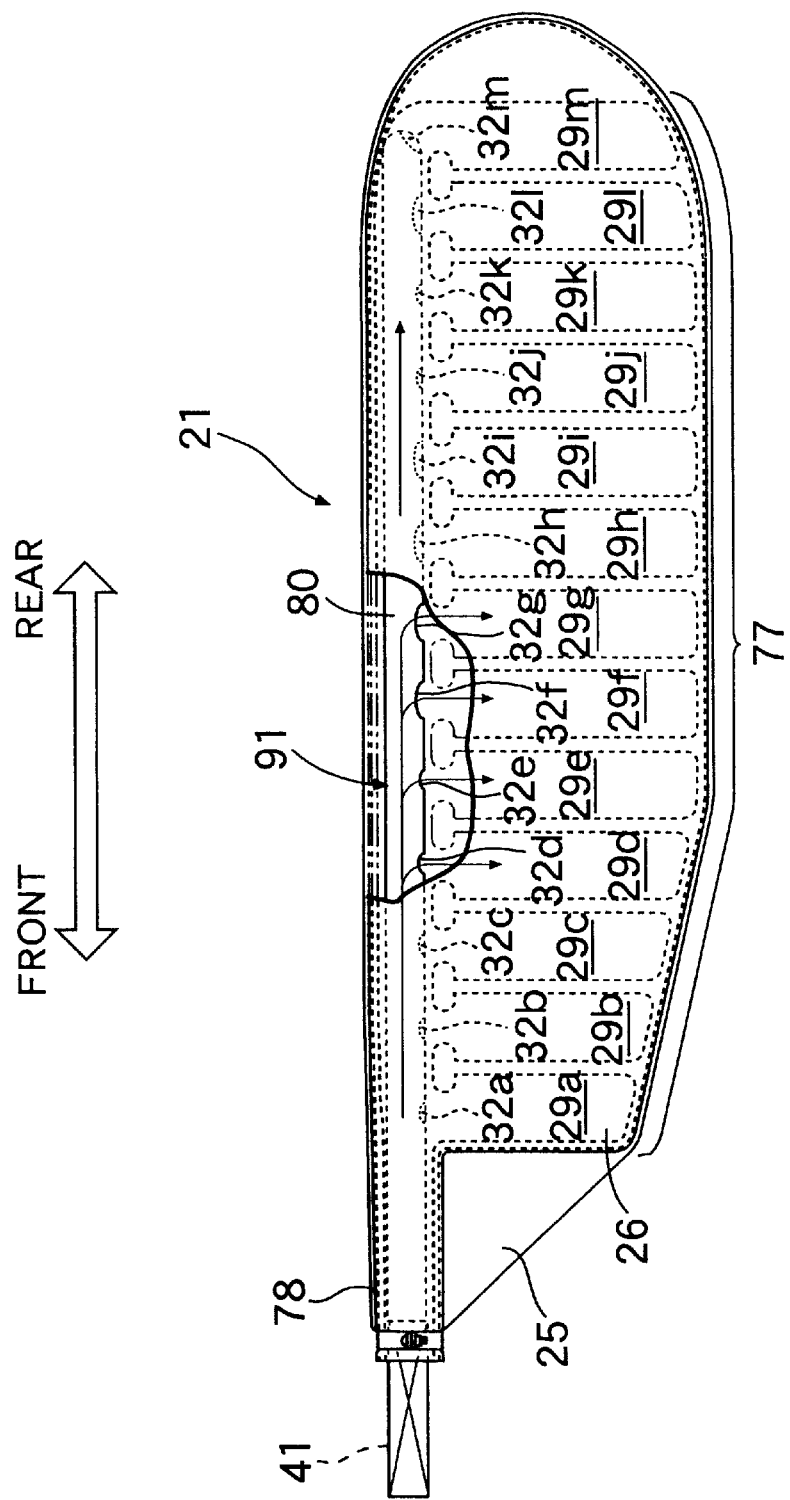

A seventh embodiment of the present invention will now be described with reference to FIG. 21.

An air bag in the seventh embodiment includes thirteen cells 29a, 29b, 29c, 29d, 29e, 29f, 29g, 29h, 29i, 29j, 29k, 29l and 29m which constitute a single cell group 77. A high-pressure gas is supplied from a first inflater 41a to a first high-pressure gas supply port 78 at a front end of the cell group 77, and a high-pressure gas is supplied from a second inflater 41b to a second high-pressure gas supply port 79 at a rear end of the cell group 77. A pipe member 91 made of a synthetic resin or a metal for connecting the first and second high-pressure gas supply ports 78 and 79 is accommodated in the air bag 21 to extend along a base end of the air bag 21, and a high-pressure gas supply passage 80 is defined by the pipe member 91. Thirteen through-bores 32a, 32b, 32c, 32d, 32e, 32f, 32g, 32h, 32i, 32j, 32k, 32l and 32m are defined in the pipe member 91 and communicate with the thirteen cells 29a to 29m, respectively. The sectional areas of passageways of the through-bores 32f to 32i in the six cells 29f to 29i opposed to the center pillar 12 and the rear pillar 15 are larger than those of the through-bores 32a to 32e, 32j and 32k in the other seven cells 29a to 29e, 29j and 29k.

According to the seventh embodiment, a high-pressure gas supply passage 80 is defined by the pipe member 91 having a high rigidity as compared with the ground fabrics 25 and 26 of the air bag 21, and the through-bores 32a to 32m are defined in the pipe member 91. Therefore, the amount of the high-pressure gas supplied to each of the cells 29a to 29m can be controlled accurately to stabilize the deploying performance of the air bag 21.

An eighth embodiment of the present invention will now be described with reference to FIGS. 22 and 23A to 23C.

Figure 23A:
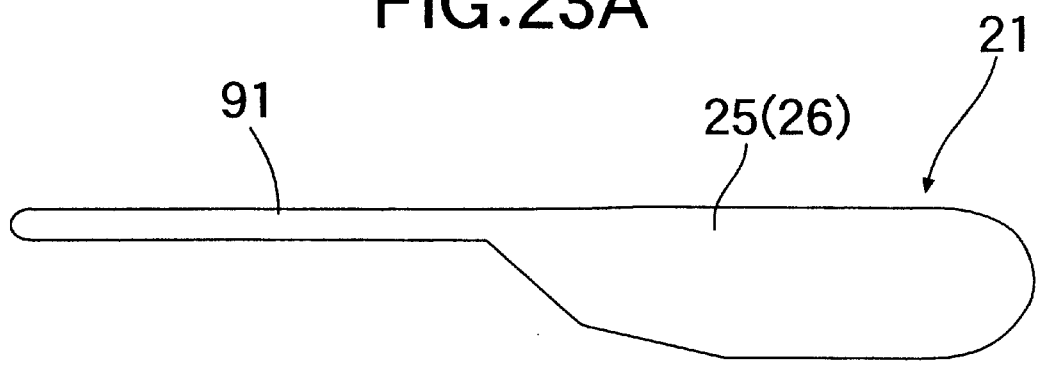
Figure 23B:
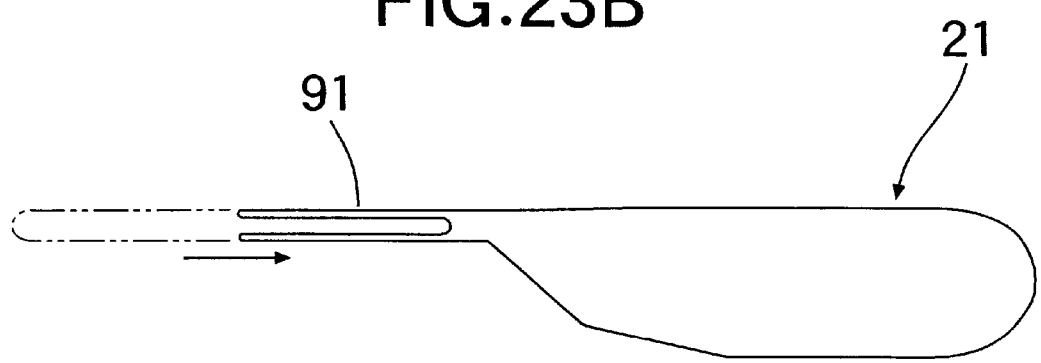
Figure 23C:
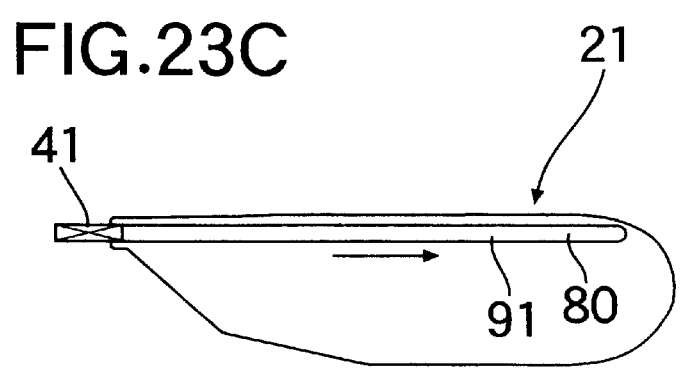
Figure 25A:
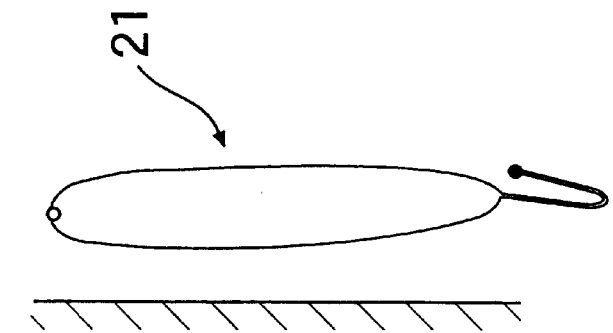
Figure 25B:
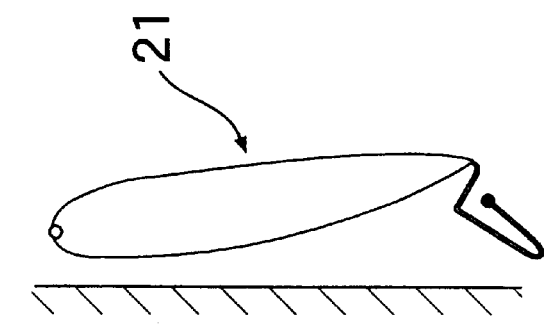
Figure 25C:
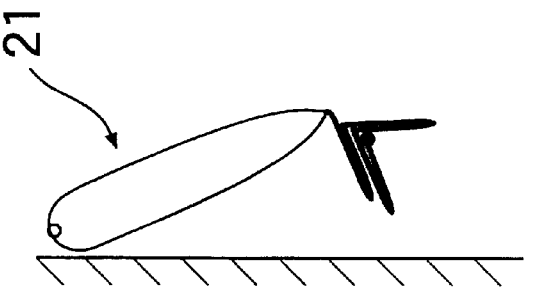
Figure 25D:
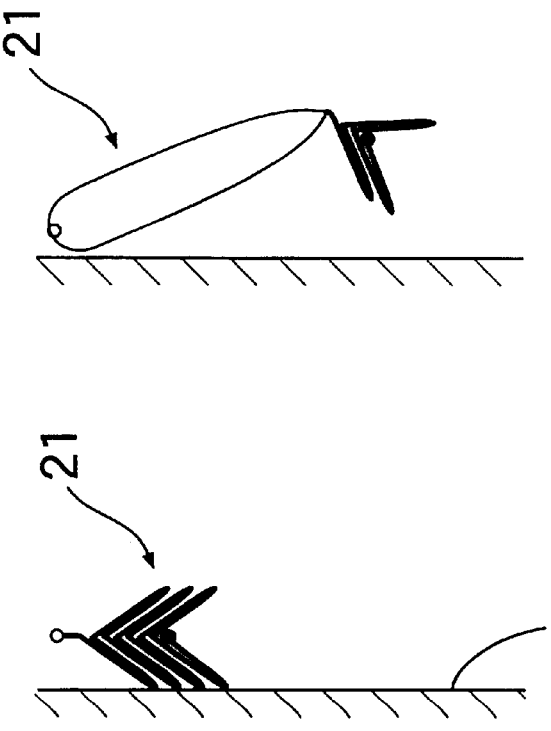
Figure 26A:
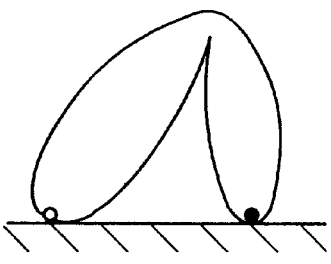
FIGS. 26A to 26D are diagrams for explaining the operation during deployment of a conventional air bag.
Figure 26B:
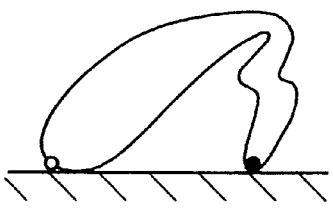
Figure 26C:
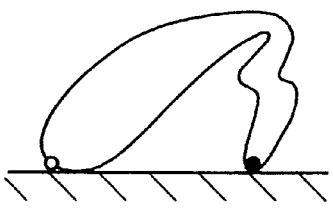
Figure 26D:
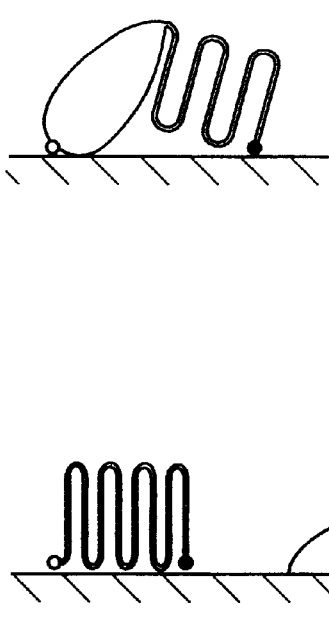

An air bag 21 in the eighth embodiment includes a single inflater 41 at a front end of a single cell group 77, and a single high-pressure gas supply passage 80 is defined integrally with a first ground fabric 25 and a second ground fabric 26 of the air bag 21. More specifically, when the first and second ground fabrics 25 and 26 are sewn to form the air bag 21, a pipe member 91 is attached by sewing, as shown in FIG. 23A, and thirteen through-bores 32a, 32b, 32c, 32d, 32e, 32f, 32g, 32h, 32i, 32j, 32k, 32l and 32m are previously defined in the pipe member 91. Then, the pipe member 91 is folded back and inserted into the air bag 21 to define the high-pressure gas supply passage 80, as shown in FIG. 23B. Thereafter, the inflater 41 is mounted to an end of the air bag 21, as shown in FIG. 23C. A high-pressure gas supplied from the inflater 41 to the high-pressure gas supply passage 80 within the pipe member 91 is supplied via the through-bores 32a to 32m defined in the pipe member 91 to cells 29a, 29b, 29c, 29d, 29e, 29f, 29g, 29h, 29i, 29j, 29k, 29l and 29m.

According the eighth embodiment, a pipe member 91 made of a material separate from the air bag is not required and hence, the number of parts and the cost can be reduced, but also the first and second ground fabrics 25 and 26 can be formed into a double structure, leading to an increased strength.

A ninth embodiment of the present invention will now be described with reference to FIGS. 24A to 25D.

FIGS. 24A to 24C show a procedure for folding up an air bag 21. First, the air bag 21 is folded in a vertically zigzag manner from a state shown in FIG. 24A to a state shown in FIGS. 24B and 24C. At this time, a tip end of the air bag 21 is located at a widthwise (laterally) central portion of the air bag 21. Then, the air bag 21 folded in the zigzag manner is folded double downwards in a widthwise direction, and the tip end is sandwiched and hidden from a lateral direction by the air bag itself, as shown in FIG. 24D.

FIGS. 25A to 25D shows a course of deployment of the air bag 21 folded up in the above manner. When a high-pressure gas is supplied from an inflater 41 to a base end of the air bag 21 which is in the folded-up state, the air bag 21 is expanded sequentially in an order of from its base end to its tip end, as shown in FIGS. 25A to 25D. Therefore, the tip end of the air bag 21 maintained in the folded-up state up to the end of the expansion is covered with the air bag itself folded double in the widthwise direction and cannot be brought into contact with the inner surface of the side of the vehicle compartment. Thus, it is possible to reliably prevent such a deployment failure that the tip end of the air bag 21 is caught on the inner surface of the vehicle compartment and bent at an intermediate portion of the air bag.

Although the embodiments of the present invention have been described in detail, it will be understood that the present invention is not limited to the above-described embodiments, and various modifications may be made without departing from the spirit and scope of the invention defined in claims.

For example, the air bag cover 58 is formed from the non-woven fabric in the embodiments, but may be formed from a sheet of any other material, and may be formed only by fastening such a sheet at a proper site by a breakable string. In any case, the air bag 21 in the folded-up state can be reliably supported on the body portion 61 of the air bag holder 61 by the support arms $61_3$ of the air bag holder 61.

The number of the high-pressure gas supply ports 31 and 35 defined in the inflater case 42 is not limited to two and may be three or more.

In addition, the sectional areas of the passageways of the through-bores 32f to 32i, 32l and 32m in the cells 29f to 29i, 29l and 29m opposed to the center pillar 12 and the rear pillar 15 are larger in the embodiments. However, if the sectional area of the passageway of each of the through-bores 32a to 32m are changed depending on the distance from the inflater 41, 41a, 41b to each of the cells 29a to 29m, the entire air bag 21 can be deployed with an appropriate timing.

What is claimed is:

1. An occupant restraint device for an interior of a vehicle, comprising:
an air bag, disposed in a folded state along an upper edge of a door opening in the vehicle, further comprising:
a first cell group having a plurality of cells capable of expanding when filled with gas;
a second cell group having a plurality of cells capable of expanding when filled with gas and independent so as not to communicate with the first cell group;
a first high-pressure gas supply port connecting the first cell group to an inflator;
a second high-pressure gas supply port connecting the second cell group to the inflator; and
the inflator for supplying gas to the first cell group and the second cell group;
wherein the inflator inflates the first cell group and the second cell group and the air bag expands into a curtain shape along the inner surface of the interior of the vehicle when the occupant restraint device is activated.

2. An occupant restraint device for an interior of a vehicle, comprising:
an air bag, disposed in a folded state along an upper edge of a door opening in the vehicle, further comprising:
a cell group having a plurality of cells which are capable of expanding when filled with gas and capable of communicating with each other;
a first high-pressure gas supply port connecting a front end of the cell group to a first inflator;
a second high-pressure gas supply port connecting a rear end of the cell group to a second inflator;
the first inflator for supplying gas to the front end of the cell group; and
the second inflator for supplying gas to the rear end of the cell group;
wherein the first inflator and the second inflator inflate the front end of the cell group and the rear end of the cell group, respectively, and the air bag expands into a curtain shape along the inner surface of the interior of the vehicle when the occupant restraint device is activated.

3. An occupant restraint device for an interior of a vehicle comprising:
an air bag, disposed in a folded state in an air bag holder secured along an upper edge of a door opening in the vehicle;
the air bag holder further comprising:
a body portion longitudinally extending along the upper edge of the door opening and divided into a plurality of sections in a direction of length of the folded air bag;

support arms integrally formed and hingedly connected along the length of the body portion for supporting the folded air bag;

an inflator for supplying gas to the air bag;

wherein the air bag and the air bag holder are secured together by common means and the inflator inflates the air bag and the air bag expands into a curtain shape along the inner surface of the interior of the vehicle when the occupant restraint device is activated.

4. The occupant restraint device of claim 3 wherein the body portion of the air bag holder is a hollow collapsible member.

5. An occupant restraint device for an interior of a vehicle having at least a front pillar, comprising:

an air bag disposed in a folded state along an upper edge of a door opening in the vehicle having a front end disposed between the front pillar and a front pillar garnish;

the front pillar garnish covering the front pillar, the front pillar garnish further comprising:
    a plurality of energy absorbing members disposed on an inner surface and having a smooth surface on a portion facing the air bag;
    a passage provided between the front pillar and the plurality of energy absorbing members for assisting in the deployment of the air bag;

an inflator for supplying gas to the air bag;

wherein the inflator inflates the air bag and the air bag expands through the passage into a curtain shape along the inner surface of the interior of the vehicle when the occupant restraint device is activated.

6. An occupant restraint device for an interior of a vehicle, comprising: an air bag, disposed in a folded state along an upper edge of a door opening in the vehicle, further comprising:

a plurality of high-pressure gas supply ports connecting the air bag to an inflator;

the inflator for supplying gas to the air bag; and an inflator case for supporting the inflator having a plurality of high-pressure gas ejecting ports corresponding to the plurality of high-pressure gas supply ports in the air bag;

wherein the inflator inflates the air bag and the air bag expands into a curtain shape along the inner surface of the interior of the vehicle when the occupant restraint device is activated.

7. An occupant restraint device for an interior of a vehicle, comprising:

an air bag, disposed in a folded state along an upper edge of a door opening in the vehicle, further comprising:

a cell group having a plurality of cells which are capable of expanding when filled with gas and capable of communicating with each other;

a high-pressure gas supply passage provided along a base of each of the plurality of cells for connecting the plurality of cells to an inflator;

a plurality of through-bores connecting the high-pressure gas supply passage to each of the plurality of cells, wherein the plurality of through-bores can be of varying diameter;

the inflator for supplying gas to the air bag;

wherein the inflator inflates the air bag and the air bag expands through the passage into a curtain shape along the inner surface of the interior of the vehicle when the occupant restraint device is activated.

8. An occupant restraint device according to claim 7, wherein the opening area of the through-bore corresponding to the cell adjacent a vehicle body pillar is set larger than those of the through-bores corresponding to the other cells.

9. An occupant restraint device according to claim 7, wherein said through-bores are defined in a pipe member which is accommodated within said air bag to define said high-pressure gas supply passage.

10. An occupant restraint device according to claim 7, wherein said high-pressure gas supply passage is defined by fastening ground fabrics of said air bag to each other.

11. An occupant restraint device for an interior of a vehicle, comprising:

an air bag, disposed in a folded state secured along an upper edge of a door opening in the vehicle, said air bag is folded with a tip end superimposed on its surface on the side of the vehicle compartment followed by a fold made in a vertical and zigzag manner; and an inflator for supplying gas to the air bag;

wherein the inflator inflates the air bag and the air bag expands into a curtain shape along the inner surface of the interior of the vehicle when the occupant restraint device is activated.

12. An occupant restraint device for an interior of a vehicle, comprising:

an air bag, disposed in a folded state secured along an upper edge of a door opening in the vehicle, said air bag is folded in a vertically zigzag manner and then folded double in a widthwise manner so that a tip is covered by the air bag; and an inflator for supplying gas to the air bag;

wherein the inflator inflates the air bag and the air bag expands into a curtain shape along the inner surface of the interior of the vehicle when the occupant restraint device is activated.

* * * * *